United States Patent
Han et al.

(10) Patent No.: US 9,877,295 B2
(45) Date of Patent: Jan. 23, 2018

(54) METHOD AND APPARATUS FOR RECORDING INFORMATION FROM A PLURALITY OF MOBILE DEVICES IN AN AREA

(71) Applicant: Ruckus Wireless, Inc., Sunnyvale, CA (US)

(72) Inventors: Yang Han, Singapore (SG); Shao Pin Hoo, Singapore (SG); Jiesheng Jason Cheow, Singapore (SG); Choong Yong Koh, Singapore (SG); See Ho Ting, Singapore (SG)

(73) Assignee: Ruckus Wireless, Inc., Sunnyvale, CA (US)

( * ) Notice: Subject to any disclaimer, the term of this patent is extended or adjusted under 35 U.S.C. 154(b) by 5 days.

(21) Appl. No.: 14/892,825

(22) PCT Filed: May 20, 2013

(86) PCT No.: PCT/SG2013/000206
§ 371 (c)(1),
(2) Date: Nov. 20, 2015

(87) PCT Pub. No.: WO2014/189462
PCT Pub. Date: Nov. 27, 2014

(65) Prior Publication Data
US 2016/0105866 A1    Apr. 14, 2016

(51) Int. Cl.
*H04W 24/00* (2009.01)
*H04W 64/00* (2009.01)
(Continued)

(52) U.S. Cl.
CPC ........... *H04W 64/00* (2013.01); *H04W 4/043* (2013.01); *H04W 24/10* (2013.01); *H04W 84/12* (2013.01); *H04W 88/02* (2013.01)

(58) Field of Classification Search
CPC ..... H04W 64/00; H04W 4/043; H04W 24/10; H04W 84/12; H04W 88/02; G06Q 30/0261; G06Q 10/063; H04L 67/306
(Continued)

(56) References Cited

U.S. PATENT DOCUMENTS 6,330,429 B1 *  12/2001  He ..................... H04W 16/00
                                                    455/134
7,116,988 B2 *  10/2006  Dietrich .............. G01S 5/0221
                                                    342/450
(Continued)

FOREIGN PATENT DOCUMENTS

EP    1016226      7/2000
EP    2518680      10/2012
(Continued)

OTHER PUBLICATIONS

"International Application No. PCT/SG2013/000206, International Search Report dated Jul. 17, 2013", (Jul. 17, 2013), 5pgs.
(Continued)

*Primary Examiner* — William Nealon
(74) *Attorney, Agent, or Firm* — Schwegman Lundberg & Woessner, P.A.

(57) ABSTRACT

A method and apparatus for recording information from a plurality of mobile devices in an area, the method comprising listening for data packets from the plurality of mobile devices in a predetermined time period, creating a record for containing addresses and signal strength readings associated with the plurality of mobile devices, determining whether a data packet received during the predetermined time period is from a mobile device of the plurality of mobile devices, determining whether an address associated with the mobile device is recorded in the record, updating the record with the address and a signal strength reading associated with the mobile device, and updating the signal strength reading
(Continued)

associated with the mobile device updating the record depending upon the number of times the record has been updated with a signal strength reading associated with the mobile device during the predetermined time period.

62 Claims, 19 Drawing Sheets

(51) Int. Cl.
*H04W 4/04* (2009.01)
*H04W 24/10* (2009.01)
*H04W 84/12* (2009.01)
*H04W 88/02* (2009.01)

(58) Field of Classification Search
USPC .................................................... 455/456.5
See application file for complete search history.

(56) References Cited

U.S. PATENT DOCUMENTS

| | | | |
|---|---|---|---|
| 7,389,114 B2* | 6/2008 | Ju | G01S 5/0252 342/458 |
| 2007/0060130 A1* | 3/2007 | Gogic | G01S 5/0252 455/440 |
| 2011/0028160 A1 | 2/2011 | Roeding et al. | |
| 2011/0047005 A1* | 2/2011 | Scanlan | G06Q 30/02 705/7.29 |
| 2012/0044865 A1* | 2/2012 | Singh | H04W 24/02 370/328 |
| 2012/0163206 A1* | 6/2012 | Leung | G01S 5/0009 370/252 |
| 2012/0244875 A1* | 9/2012 | Cardona | G01S 5/0252 455/456.1 |
| 2012/0278132 A1* | 11/2012 | Weigh | G06Q 30/0261 705/7.34 |
| 2013/0088982 A1 | 4/2013 | Jeon et al. | |
| 2013/0217332 A1* | 8/2013 | Altman | H04H 60/90 455/41.2 |

FOREIGN PATENT DOCUMENTS

| | | |
|---|---|---|
| WO | WO-1999/017463 | 4/1999 |
| WO | WO-2005/091915 | 10/2005 |
| WO | WO-2010150031 | 12/2010 |
| WO | WO-2014/189462 | 11/2014 |

OTHER PUBLICATIONS

"European Application No. 13885378.3, Extended European Search Report dated Jan. 17, 2017", (Jan. 17, 2017), 8 pgs.

* cited by examiner

Example for TFR of M1-Bj

| MAC Addresses \ RSSI Reading No. | 1 | 2 | 3 | 4 | 5 | 6 | 7 | 8 | 9 | 10 | ... | 21 | 22 | 23 | 24 | 25 | 26 | 27 | 28 | 29 | 30 |
|---|---|---|---|---|---|---|---|---|---|---|---|---|---|---|---|---|---|---|---|---|---|
| MAC1 | -75 | -71 | -80 | -73 | -74 | -78 | -76 | -74 | -67 | -69 | ... | -73 | -78 | -73 | -71 | -74 | -73 | -73 | -76 | -74 | -77 |
| MAC2 | -48 | -57 | -53 | -52 | Nil | -49 | -50 | -47 | Nil | Nil | ... | Nil | Nil | Nil | Nil | Nil | -60 | -49 | -58 | -56 | Nil |
| MAC3 | Nil | Nil | Nil | Nil | Nil | -82 | -80 | -83 | -82 | Nil | ... | -78 | -77 | -80 | -83 | Nil | -83 | -82 | -79 | -80 | -75 |
| ... | ... | ... | ... | ... | ... | ... | ... | ... | ... | ... | ... | ... | ... | ... | ... | ... | ... | ... | ... | ... | ... |
| MACN | -66 | -63 | -65 | -63 | -67 | -65 | -68 | -68 | -64 | Nil | ... | -70 | -69 | -67 | Nil | Nil | -66 | -63 | -62 | -65 | Nil |

Columns 1–5: Collected during M1-Bi-Sj, where j=6*(i-1)+1
Columns 6–10: Collected during M1-Bi-Sj, where j=6*(i-1)+2
Columns 21–22: Collected during M1-Bi-Sj, where j=6*(i-1)+5
Columns 26–30: Collected during M1-Bi-Sj, where j=6*(i-1)+6

Example for Footfall Report of M1

| MAC Addresses \ Batch No. | 1 | 2 | 3 | 4 | 5 | 6 | 7 | 8 | 9 | 10 |
|---|---|---|---|---|---|---|---|---|---|---|
| MAC1 | -73.75 | -69.3 | -70.25 | -73.1 | -72.65 | -73.3 | -76.1 | -74.5 | -69.7 | -69.5 |
| MAC2 | -51.25 | Nil | -55.5 | -54.2 | -56.7 | Nil | Nil | Nil | -48.8 | -50.3 |
| MAC3 | -80.22 | Nil | Nil | Nil | Nil | Nil | Nil | Nil | Nil | Nil |
| . | ... | ... | ... | ... | ... | ... | ... | ... | ... | ... |
| MACN | -65.18 | -66 | -67.1 | Nil | Nil | -64.4 | -68.5 | -59.8 | -62.5 | -66.6 |

Example for TCRR of M1-Sj                1304

| MAC Addresses \ RSSI Reading No. | 1 | 2 | 3 | 4 | 5 | 6 | 7 |
|---|---|---|---|---|---|---|---|
| MAC1 | -72 | -69 | -77 | -80 | -76 | -75 | 79 |
| MAC2 | -49 | -53 | -56 | -50 | -45 | -46 | Nil |
| MAC3 | Nil | Nil | Nil | Nil | Nil | Nil | Nil |
| ⋮ | ... | ... | ... | ... | ... | ... | ... |
| MACN | -62 | -64 | -63 | -65 | Nil | Nil | Nil |

1302 (row label) / 1300 (table)

Example for Calibration/RTLS Report of M1-Sj

| MAC Address | RSSI Readings |
|---|---|
| MAC1 | -75.8 |
| MAC2 | -49.5 |
| MAC3 | Nil |
| ⋮ | ... |
| MACN | -63.5 |

1500
1502  1504

METHOD AND APPARATUS FOR RECORDING INFORMATION FROM A PLURALITY OF MOBILE DEVICES IN AN AREA

PRIORITY CLAIM TO RELATED APPLICATIONS

This application is a U.S. national stage application filed under 35 U.S.C. § 371 from International Application Serial No. PCT/SG2013/000206, which was filed 20 May 2013, and published as WO2014/189462 on 27 Nov. 2014, which application and publication are incorporated by reference as if reproduced herein and made a part hereof in their entirety, and the benefit of priority of which is claimed herein.

FIELD OF THE INVENTION

The present invention generally relates to a method and apparatus for recording information from a plurality of mobile devices in an area, in particular, a method and apparatus of a WiFi positioning system (WPS) for recording information from WiFi-enabled devices in an area.

BACKGROUND

In recent years, high usage of mobile devices with Internet services has sparked an increase in wireless computing services providing real-time, contextual, and personalized applications. One of the key technologies contributing to this increase is positioning technology, which is capable of providing accurate location contexts relating to such mobile devices.

Location-based services (LBS) based on Global Positioning System (GPS) in mobile devices, especially in smart phones, have been gaining popularity over the last decade. However, accurate positioning via GPS is lost once a mobile device is moved indoors, or into dense urban areas. When indoors, GPS signals between the mobile device and satellite would lose line-of-sight and the GPS would cease to operate. In the case of urban areas, signal attenuation and multi-path effects caused by physical obstacles (mainly tall buildings) can make GPS signals undetectable.

Numerous techniques have been proposed to deal with situations where GPS service is not available. A cellular tower triangulation method serves as a solution for mobile devices with connectivity to cellular networks (e.g. GSM, UMTS, etc.). In this method, cellular towers whose geographical locations are known are used as reference points to calculate location of a mobile device communicating with them. While the method has an advantage of not requiring users to provide dedicated equipment in addition to those existing in a cellular network, cellular tower triangulation suffers from low positioning accuracy, which could, for instance, provide location readings that are above 50-100 meters off from the actual location.

Positioning technology based on Wireless Local Area Network (WLAN), in particular Wireless Fidelity (Wi-Fi) systems, has attracted research attention in both academic and industry communities. This is probably due to a fact that Wi-Fi systems are operating on a relatively high radio frequency and they have a much smaller coverage compared to cellular based systems. Both of these features contribute to higher positioning accuracy. Most Wi-Fi positioning solutions currently available are designed to track people or asset in a certain controlled premise, e.g. a hospital or a warehouse. However, most of such solutions require dedicated equipment, e.g. a Wi-Fi tag, to be attached to the person or asset in order for its location to be tracked. Furthermore, a data connection is usually required between the dedicated equipment and Wi-Fi access points for exchanging synchronization information before tracking takes place. Hence, currently available Wi-Fi positioning solutions are not workable without such dedicated equipment and conscious effort put in by a user to operate the system to track a person or asset.

SUMMARY

According to one aspect of the present invention, there is provided a method for recording information from a plurality of mobile devices in an area, the method comprising:
   listening for data packets from the plurality of mobile devices in a predetermined time period using a wireless device;
   creating a record for containing addresses and signal strength readings associated with the plurality of mobile devices, the addresses and signal strength readings of the mobile devices being retrieved from data packets received by the wireless device when the wireless device is listening;
   determining whether a data packet received by the wireless device during the predetermined time period is from a mobile device of the plurality of mobile devices;
   determining whether an address associated with the mobile device is recorded in the record if the data packet received by the wireless device during the predetermined time period is from the mobile device;
   updating the record with the address associated with the mobile device and a signal strength reading associated with the mobile device if the data packet received is from the mobile device and the address has not been previously recorded into the record during the predetermined time period; and
   updating the record with a signal strength reading associated with the mobile device if the data packet is from the mobile device and the address of the mobile device is previously updated into the record, and updating the record depending upon the number of times the record has been updated with a signal strength reading associated with the mobile device during the predetermined time period.

The method may comprise
   increasing a count associated with the address of the mobile device each time the record is updated as a result of the wireless device receiving a data packet from the mobile device during the predetermined time period, the count being reset at beginning of the predetermined time period.

Updating of the record with a signal strength reading associated with the mobile device during the predetermined time period may stop when the count reaches a predetermined number.

The wireless device may communicate with the plurality of mobile devices based on Wireless Fidelity (WiFi) technology.

The predetermined time period may comprise
   a first time period for recording received addresses and signal strength readings associated with one or more of the plurality of mobile devices into the record for tracking footfall of the plurality of mobile devices in the area; and
   a second time period for recording received addresses and signal strength readings associated with one or more of the plurality of mobile devices into a second record created and updated in same manner as the record for estimating location of one or more of the plurality of mobile devices in the area.

Signal strength readings associated with the mobile device may be updated into the record lesser times than signal strength readings associated with the mobile device that are recorded into the second record.

The method may comprise updating the record with a null signal strength reading if the address of the mobile device is previously updated into the record, and if a data packet is not received from the mobile device before a predetermined sampling time within the predetermined time period expires.

The method may comprise generating a report by extracting all signal strength readings of the mobile device in the record;

discarding null signal strength reading, if any is present in the record; and calculating a truncated mean value from the extracted and non-discarded signal strength readings of the mobile device.

The method may further comprise transmitting from the wireless device one or more data packets associated with the report to a collating application of a server for collating a collated report for the mobile device based on data of reports received by the server from the wireless device.

The method may further comprise formatting the collated report;

forwarding the collated report to a processor for calculating an estimated location of the mobile device based on data in the collated report; and storing the estimated location in a database accessible by the mobile device via a network.

The method may further comprise generating footfall tracking analytics based on estimated locations of more than one of the plurality of mobile devices;

storing the generated footfall tracking analytics in a footfall tracking database accessible by networked devices.

The method may further comprise transmitting the address of the mobile device to a data management application of a server via a data communication protocol requiring no acknowledgement from a receiver upon receiving a data message from a sender; and updating the address received by the data management application into a server record, the server record residing in a memory accessible to the server.

The step of creating the record for containing addresses and signal strength readings associated with the plurality of mobile devices may further comprise appending the address received by the data management application to a data message at the server;

sending the data message from the server to an agent application associated with the wireless device; and adding the address retrieved from the data message received by the agent application into a third record residing in a memory accessible to the wireless device.

According to another aspect of the present invention, there is provided an apparatus for recording information from a plurality of mobile devices in an area, the apparatus comprising:

a wireless device configured for listening for data packets from the plurality of mobile devices in a predetermined time period;

a processing unit configured for creating a record for containing addresses and signal strength readings associated with the plurality of mobile devices, the addresses and signal strength readings of the mobile devices being retrieved from data packets received by the wireless device when the wireless device is listening;

determining whether a data packet received by the wireless device during the predetermined time period is from a mobile device of the plurality of mobile devices;

determining whether an address associated with the mobile device is recorded in the record if the data packet received by the wireless device during the predetermined time period is from the mobile device;

updating the record with the address associated with the mobile device and a signal strength reading associated with the mobile device if the data packet received is from the mobile device and the address has not been previously recorded into the record during the predetermined time period; and updating the record with a signal strength reading associated with the mobile device if the data packet is from the mobile device and the address of the mobile device is previously updated into the record, and updating the record depending upon the number of times the record has been updated with a signal strength reading associated with the mobile device during the predetermined time period.

The processing unit may be configured for increasing a count associated with the address of the mobile device each time the record is updated as a result of the wireless device receiving a data packet from the mobile device during the predetermined time period, the count being reset at beginning of the predetermined time period.

Updating of the record with a signal strength reading associated with the mobile device during the predetermined time period may stop when the count reaches a predetermined number.

The wireless device may communicate with the plurality of mobile devices based on Wireless Fidelity (WiFi) technology.

The predetermined time period may comprise a first time period for recording received addresses and signal strength readings associated with one or more of the plurality of mobile devices into the record for tracking footfall of the plurality of mobile devices in the area, and a second time period for recording received addresses and signal strength readings associated with one or more of the plurality of mobile devices into a second record created and updated in same manner as the record for estimating location of one or more of the plurality of mobile devices in the area.

Signal strength readings associated with the mobile device may be updated into the record lesser times than signal strength readings associated with the mobile device that are recorded into the second record.

The processing unit may be configured for updating the record with a null signal strength reading if the address of the mobile device is previously updated into the record, and if a data packet is not received from the mobile device before a predetermined sampling time within the predetermined time period expires.

The processing unit may be configured for generating a report by extracting all signal strength readings of the mobile device in the record;

discarding null signal strength readings, if any are present in the record; and calculating a truncated mean value from the extracted and non-discarded signal strength readings of the mobile device.

The apparatus may further comprise a server and the wireless device being configured for transmitting one or more data packets associated with the report to a collating application of the server for collating a collated report for the mobile device based on data of reports received by the server from the wireless device.

The server may be configured for formatting the collated report;

forwarding the collated report to a processor for calculating an estimated location of the mobile device based on data in the collated report; and storing the estimated location in a database accessible to the mobile device via a network.

The server may be configured for generating footfall tracking analytics based on estimated locations of more than one of the plurality of mobile devices;

storing the generated footfall tracking analytics in a footfall tracking database accessible to networked devices.

The mobile device may be configured for transmitting its address to a data management application run by a server, the server being configured for updating a server record with the address received by the data management application, the server record residing in a memory accessible to the server running the data management application.

The server running the data management application may be configured for appending the address received by the data management application to a data message;

sending the data message to an agent application associated with the wireless device; and updating the address retrieved from the data message received by the agent application into a third record residing in a memory accessible to the wireless device.

According to another aspect of the present invention, there is provided a machine-readable medium, having stored thereon machine-readable instructions for executing, in a machine, a method for creating a record, the method comprising:

listening for data packets from the plurality of mobile devices in a predetermined time period using a wireless device;

creating a record for containing addresses and signal strength readings associated with the plurality of mobile devices, the addresses and signal strength readings of the mobile devices being retrieved from data packets received by the wireless device when the wireless device is listening;

determining whether a data packet received by the wireless device during the predetermined time period is from a mobile device of the plurality of mobile devices;

determining whether an address associated with the mobile device is recorded in the record if the data packet received by the wireless device during the predetermined time period is from the mobile device;

updating the record with the address associated with the mobile device and a signal strength reading associated with the mobile device if the data packet received is from the mobile device and the address has not been previously recorded into the record during the predetermined time period; and updating the record with a signal strength reading associated with the mobile device if the data packet is from the mobile device and the address of the mobile device is previously updated into the record, and updating the record depending upon the number of times the record has been updated with a signal strength reading associated with the mobile device during the predetermined time period.

BRIEF DESCRIPTION OF THE DRAWINGS

Embodiments of the invention will be better understood and readily apparent to one sufficiently skill in the art from the following written description, by way of example only and in conjunction with the drawings, in which:

FIG. 8 shows an example of a Temporary Footfall Record of an example of the present invention.

FIG. 11 shows an example of a Footfall Report of an example of the present invention.

DETAILED DESCRIPTION

Figure 1:
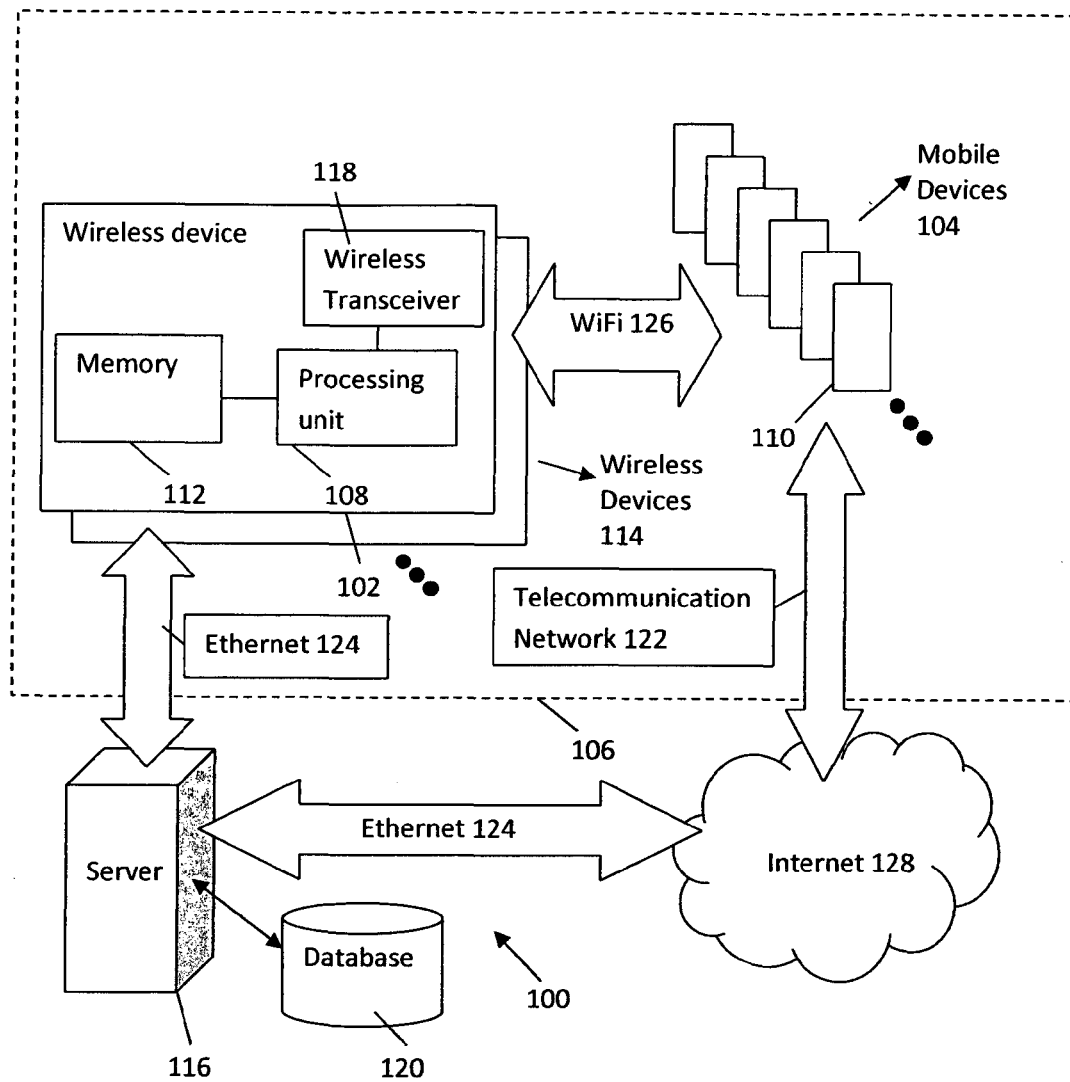
FIG. 1 illustrates system architecture of an example of the present invention.

In FIG. 1, there is shown an apparatus 100 for recording information from a plurality of mobile devices 104 in an area 106. The apparatus 100 comprises a wireless device 102 configured to listen for data packets from the plurality of mobile devices 104 in a predetermined time period. The apparatus further comprises a processing unit 108 configured to create a record for containing addresses and signal strength readings associated with the plurality of mobile devices 104. The addresses and signal strength readings of the mobile devices 104 are retrieved from the data packets received by the wireless device 102 when the wireless device 102 is listening.

In the example shown in FIG. 1, the processing unit 108 resides in the wireless device 102 and the record resides in a memory 112 accessible to the wireless device 102. Communication, if any, between the wireless device 102 and the plurality of mobile devices 104 is based on Wireless Fidelity (WiFi) Technology 126 and the wireless device includes a wireless communication transceiver 118 for communicating with the plurality of mobile devices 104 when it is required. Each of the plurality of mobile devices 104 could be a WiFi enabled smart phone, touchscreen tablet, computer netbook, and the like, and it is identifiable by an address that is a unique Media Access Control (MAC) address. In this case, the signal strength readings could be Received Signal Strength Information (RSSI) values associated with the respective mobile device.

Certain services could be provided by a WiFi positioning system having features of the apparatus 100 and components such as a server, memory accessible to the server, a data management application and an agent application.

In the implementation of some services employing the WiFi positioning system, a client based software in the form of a mobile application is required to be downloaded and installed onto one of the plurality of mobile devices 104, e.g. the mobile device 110, from the Internet 128 via a telecommunication network 122 such as Fourth/Third/Second Generation (4G/3G/3.5G/2G) telecommunication network 122, a General Packet Radio Service (GPRS) data link, and the like. For the present example, whether a mobile application is required depends on whether RTLS i.e. real time location service is required or not. If RTLS is required, a mobile application would be required.

With WiFi function switched on, the mobile device 110 transmits WiFi data packets wirelessly according to WiFi communication protocols with neighbouring wireless devices 114 that are WiFi enabled and activated (e.g. a wireless access point) in the area 106. The wireless device 102 may be one of the neighbouring wireless devices. More than one of the wireless device 102 (hereinafter known collectively as "the deployed wireless devices 114") may be deployed in the area 106.

The WiFi data packets include information such as MAC address of the mobile device 110 and received signal strength of the mobile device 110. The WiFi data packets may include probing packets, control packets, and data packets. Based on the WiFi communication protocols, even when there is no active data transmission in a WiFi network, probing packets and control packets are still being transmitted periodically.

When a mobile device such as mobile device 110 is present at any location within the area covered by the range of the WiFi positioning system, the one or more of the deployed wireless devices 114 is constantly listening and receiving WiFi data packets transmitted by the mobile device 110. Each of the deployed wireless devices 114, e.g. wireless device 102, follows a record updating procedure to update information relating to MAC addresses and Received Signal Strength Information (RSSI) values retrieved from the WiFi data packets transmitted by the mobile device 110 to the record in the memory 112. The record updating procedure is as follows.

Firstly, the processing unit 108 determines whether a WiFi data packet received by the wireless device 102 during the predetermined time period is from a mobile device of the plurality of mobile devices 104. For illustration, the WiFi data packet is taken to be sent by the mobile device 110. The processing unit 108 further determines whether the MAC address associated with the mobile device 110 is recorded in the record in the memory 112 if the data packet received by the wireless device 102 during the predetermined time period determined to be from the mobile device 110.

The processing unit 108 updates the record with the MAC address associated with the mobile device 110 and a signal strength reading associated with the mobile device 110 if the data packet received is found to be from the mobile device 110 and the address of the mobile device 110 has not been previously recorded into the record during the predetermined time period. Furthermore, the processing unit 108 updates the record with a signal strength reading associated with the mobile device 110 if the data packet is found to be from the mobile device 110 and the address of the mobile device is previously updated into the record, and updates the record depending upon the number of times the record has been updated with a signal strength reading associated with the mobile device 110 during the predetermined time period. Updating the record depending upon the number of times the record has been updated with a signal strength reading associated with the mobile device 110 is helpful as a form of control to reduce unnecessary updating, which increases precious processing time, and to adjust accuracy of calculations that may follow, which rely on number of entries of signal strength readings associated with the mobile device 110 in the record.

When the processing unit 108 is updating the record, the processing unit 108 may be further configured for increasing a count associated with the MAC address of the mobile device 110 each time the record is updated as a result of the wireless device 102 receiving a data packet from the mobile device 110 during the predetermined time period and the count is reset at beginning of the predetermined time period. This count is helpful as the execution of further procedures can be configured depending upon the value of the count. For instance, a procedure may be added to stop the updating of the record with a signal strength reading associated with the mobile device 110 during the predetermined time period when the count reaches a predetermined number. Limiting the number of times to update the record with a signal strength reading associated with the mobile device 110 based on the count helps to reduce unnecessary processing and determines a level of accuracy of calculations relying on the number of entries in the updated record. For instance, the calculation of a mean RSSI value corresponding to a particular mobile device is regarded as having higher accuracy if the mean RSSI value is calculated from a higher number of signal strength readings of the particular mobile device in the record.

The predetermined time period may comprise a first time period for recording received addresses and signal strength readings associated with one or more of the plurality of mobile devices 104 into the record for purposes of tracking footfall of the plurality of mobile devices 104 in the area 106. The predetermined time period may further comprise a second time period for recording received MAC addresses and signal strength readings associated with one or more of the plurality of mobile devices 104 into a second record created and updated in same manner as the record for purposes of estimating location of one or more of the plurality of mobile devices 104 in the area 106. In this manner, the apparatus 100 provides two separate records for two different purposes, one of which would be used for calculations required for tracking footfall of the plurality of mobile devices 104 in the area 106, and the other would be used for calculations required for estimating location of one or more of the plurality of mobile devices 104 in the area 106. Each of the two records can be forwarded accordingly to respective processors for carrying out the calculations for the two different purposes. In this manner, separate resources can be allocated for different purposes, which may reduce processing time.

In the example of FIG. 1, the signal strength readings associated with the mobile device 110 may be updated into the record lesser times than signal strength readings associated with the mobile device 110 that are recorded into the second record. The reason for doing so is that higher accuracy is preferred for the purposes of estimating location of one or more of the plurality of mobile devices 104 in the area 106 compared to that required for tracking footfall of the plurality of mobile devices 104 in the area 106. For instance, for estimating location of one or more of the plurality of mobile devices 104 in the area 106, a mean RSSI value corresponding to a particular mobile device should be calculated from a higher number of signal strength readings of the particular mobile device recorded in the second record compared to the number of signal strength readings of the particular mobile device recorded into the record.

Furthermore, the processing unit 108 may be configured for updating the record with a null signal strength reading if the MAC address of the mobile device 110 is previously updated into the record, and if a data packet is not received from the mobile device 110 before a predetermined sampling time within the predetermined time period expires. This feature ensures that the processing unit 108 still continue with other processes when no signal strength reading associated with the mobile device 110 is received after a reasonable amount of time. The predetermined sampling time is set with the reasonable amount of time.

After updating of the record by the processing unit 108, the processing unit 108 may generate a report by extracting all signal strength readings of the mobile device 110 in the record, discarding null signal strength reading, if any such null signal strength reading is present in the record, and calculating a truncated mean value from the extracted and non-discarded signal strength readings of the mobile device 110. A null signal strength reading may be updated into the record when no signal strength reading is obtained for the corresponding mobile device address from WiFi data packets received by the wireless device 102 in a predetermined time frame.

After generation of the report by the processing unit 108, in the example of FIG. 1, the wireless device 102 is configured for transmitting one or more data packets associated with the generated report to a collating application of a server 116 for collating a collated report for the mobile device 110 based on data of reports received by the server from the wireless device 102 (or similarly from any one of the wireless devices 114). The one or more data packets associated with the generated report includes MAC addresses and corresponding RSSI values obtained by the wireless device 102 (or similarly from any one of the wireless devices 114) over a selected time period. The server 116 may be a component of the apparatus 100 and the collated report could be a report containing only RSSI values associated with the MAC address of the mobile device 110 that have been obtained by one or more of the deployed wireless devices 114, including wireless device 102. In the example of FIG. 1, the deployed wireless devices 114 communicates with the server 116 via Ethernet 124 and the server 116 is connected to the Internet 128 via an Ethernet 124 connection. It is appreciated that there could be more than one server instead of just the server 116.

Furthermore, in the example of FIG. 1, the server 116 is configured for formatting the collated report, forwarding the collated report to a processor (not shown in FIG. 1) for calculating an estimated location of the mobile device 110 based on data in the collated report, and storing the estimated location of the mobile device 110 in a database 120 accessible to the mobile device 110 or the plurality of mobile devices 104 via a network such as that formed by the telecommunication network 122, the Internet 128 and the Ethernet connection 124 between the server 116 and the Internet 128. In this case, the database 120 is connected to the server 116 and the server 116 is configured to make the database 120 available to the mobile device 110 or the plurality of mobile devices 104 via the network. It is appreciated that there could be more than one of the database 120 for different purposes.

If the service implemented by the WiFi positioning system is to provide system calibration to, for instance, generate a Radio Map of the area 106, the collated reports are sent from the server 116 to a Calibration (CA) processor for generating the Radio Map. The Radio Map is then saved into the database 120 or a dedicated database for storing system calibration data such as the Radio Map for further use. A Radio Map contains a list of calibration points and data that are useful for calculations to estimate the locations of each of the plurality of mobile devices 104 in the area 106. Each calibration point (CP) may be characterized by the following information:

1) XY co-ordinates with respect to horizontal (X) and vertical (Y) axes defined for the area 106 and indicating the physical location of a CP in the form (x, y).

2) A list of MAC addresses of the deployed wireless devices 114 detected during onsite measurements occurring in the area 106 at the location of a CP.

3) A list of mean Received Signal Strength values, mRSS, associated with the MAC addresses of the plurality of mobile devices 104 that have responded to each of the deployed wireless devices 114 during the respective record updating procedure carried out by each of the deployed wireless devices 114. These mRSS values can be calculated based on data in the collated reports. Each MAC address associated to a mobile device would only have one corresponding mRSS value. Each of the mRSS values can be calculated by averaging a few measurements of RSSI values corresponding to a MAC address of a particular mobile device in the collated reports.

For services providing or requiring positioning or location information of the plurality of mobile devices 104, including services providing footfall information of the plurality of mobile devices 104 in the area 106, the collated reports can be sent from the server 116 to a Real Time (RT) processor and/or a Footfall (FF) processor for calculating estimated locations of one or more of the plurality of mobile devices 104. Data of the estimated locations are then saved into the database 120 or dedicated databases for Real Time processing required by certain applications or Footfall analysis for further use. In the case where the locations of the plurality of mobile devices 104 are within a building, the estimated location of each mobile device may include information of a storey of the building that it is on and a position estimate of the mobile device on the storey.

It is appreciated that the Calibration (CA) processor, Real Time (RT) processor and Footfall (FF) processor are logically/functionally separate processors but physically they could be realized by the same piece of hardware.

In the case where the WiFi positioning system provides a service for providing footfall information of the plurality of mobile devices 104 in the area 106, the server 116 can be further configured for generating footfall tracking analytics based on the estimated locations of more than one of the plurality of mobile devices 104 and for storing the generated footfall tracking analytics in the database 120 or a dedicated footfall tracking database accessible to networked devices. Networked devices cover all types of electronic devices with wired or wireless access to an Intranet or the Internet 128, for instance, a networked enabled desktop computer, laptop, tablet device, smartphone, and the like. Access to data of the footfall tracking analytics or to footfall information derived from the footfall tracking analytics can be made available to the networked devices by way of presentation of the footfall information on a webpage in the Internet 128.

If the service implemented by the WiFi positioning system is to provide system calibration to, for instance, generate a Radio Map of the area 106, or to provide positioning or location information of the plurality of mobile devices 104, one of the plurality of mobile devices 104, in this case taking the mobile device 110 as an example, may be configured by a downloaded mobile application to transmit the MAC address of the mobile device 110 to a data management application run by a server, which in this case is the server 116. The server 116 may be configured for updating a server record with the MAC address received by the data management application. The server record may be residing in a memory accessible to the server running the data management application. This memory may for instance be located in the database 120. Receipt of the MAC address by the server 116 can be taken as a request by the user of the mobile device 110 for service to activate system calibration or to provide positioning or location information of the mobile device 110. Receipt of the MAC address by the server 116 can also be taken as a trigger for certain actions. Examples of such actions are activation push/pull services such as transmission of advertisements and the like to the mobile device 110 from the wireless device 102 via WiFi or from the server 116 via the Internet 128 and/or the telecommunication network 122, or activation of the server 116 to track the location of the mobile device 110 for footfall analysis or other purposes.

The server 116 running the data management application may be further configured for appending the MAC address received by the data management application to a data message, sending the data message to an agent application associated with the wireless device 102, and updating the MAC address retrieved from the data message received by the agent application into a third record residing in a memory accessible to the wireless device 102. As such, once the wireless device 102 has access to the MAC address, it can be taken a trigger for certain actions. Example of such actions are activation of the wireless device 102 to listen for data packets from the mobile device 110 for recording information relating to the mobile device 110, or to provide services to the mobile device 110 for whatever predetermined intention.

FIGS. 2 to 15 illustrate with more details a WiFi positioning system 200 having features of the apparatus 100 in FIG. 1 and components such as the server 116, database accessible to the server 116, a data management application and an agent application. Although the components of the WiFi positioning system 200 are named differently from the similar components in FIG. 1, it is appreciated that the operation and features of the components would remain substantially the same.

Figure 2:
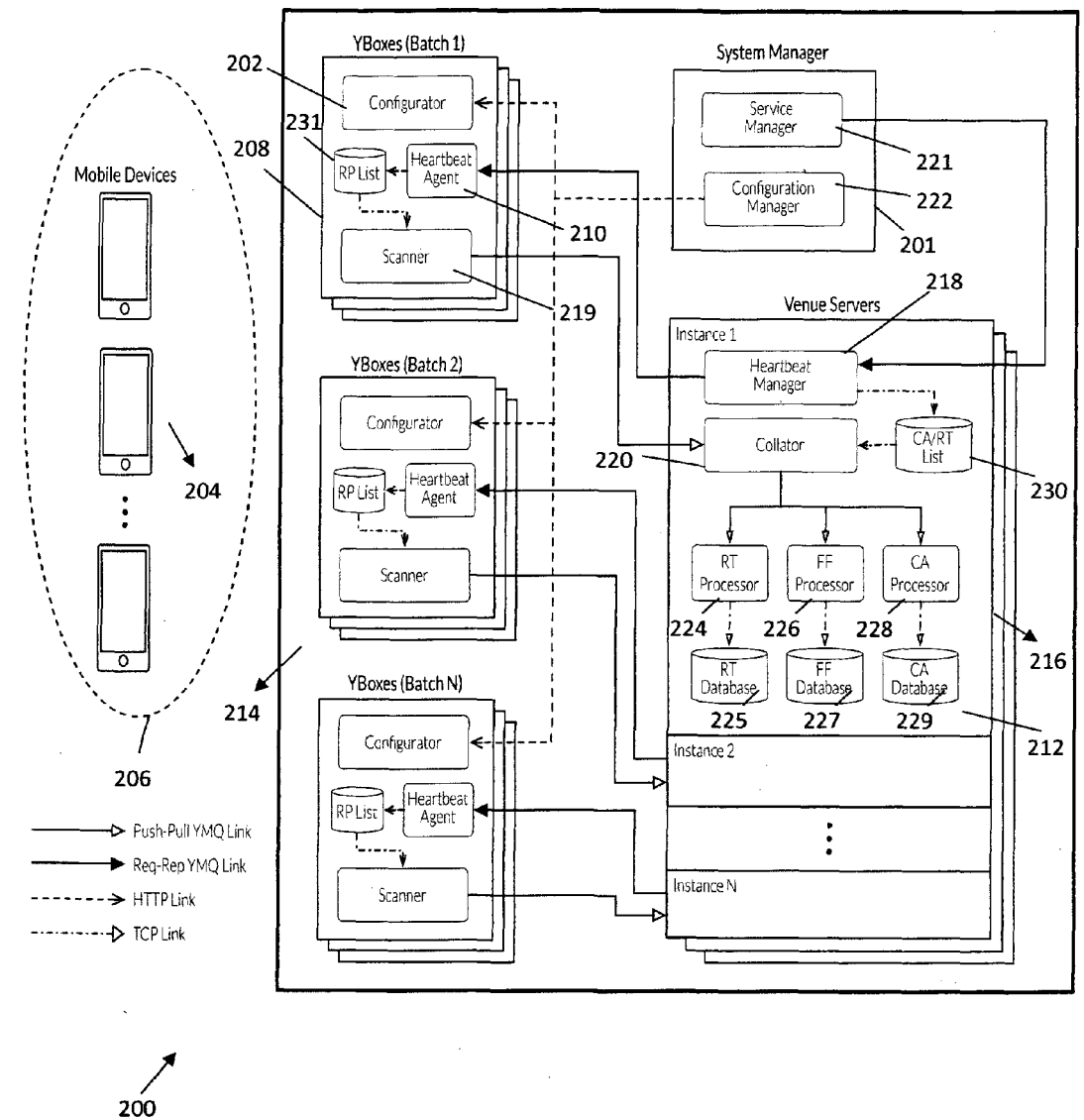
FIG. 2 illustrates system architecture of a second example of the present invention.

FIG. 2 includes a WiFi Positioning System (WPS) 200 comprising a few system components, namely a plurality of YBoxes 214 (similar to the plurality of wireless devices 114 in FIG. 1), a plurality of venue servers 216 and their corresponding venue instances (similar to the server 116 in FIG. 1), and a System Manager 201 (similar to the data management application described with reference to FIG. 1) for supporting a plurality of mobile devices 204 (similar to the plurality of mobile devices 104).

Each of the YBoxes 214 is a WiFi router (also known herein as an access point) installed within the vicinity of a site or area 206 (similar to area 106) where location-based services (LBS) are provided by the WiFi positioning system 200.

Furthermore, each of the plurality of venue servers 216 could be a single venue server hosted on one Linux-based server hardware. It is appreciated that the venue servers 216 could also be Unix-based, Windows based and the like. Each venue server can host up to 'N' number (an arbitrary number) of venue instances. Each venue instance can connect up to a batch having 'X' number (an arbitrary number) of the YBoxes 214 that are installed in the vicinity of a single LBS site, e.g. area 206. A venue instance is a software object programmed to perform a set of functions with data inputs coming from one or more of the 'X' number (an arbitrary number) of the YBoxes 214 that are connected to the venue instance.

All the YBoxes 214 are sorted into batches and each of the YBoxes 204, for example YBox 208, which belongs to a Batch 1, has the following features.

Each of the YBoxes 214 in Batch 1 has the ability to capture and analyse WiFi data packets transmitted by the mobile devices 204 within the area 206 of WiFi coverage of the WiFi positioning system 200 and the ability to communicate with both a connected venue Instance and the System Manager 201 via an Internet connection (i.e. the Internet connection 128 in FIG. 1). Internet connectivity of each of the YBoxes 214 in this case may be provided via a port connection to a wired Wide Area Network (WAN), a 3G mobile broadband service provided by a 3G enabled Universal Serial Bus (USB) dongle, or over a WiFi connection with one of the YBoxes 214 that is acting as a designated master YBox and the master YBox has either the WAN connection or the 3G mobile broadband service.

Each of the YBoxes 214 in Batch 1, for example YBox 208, gets operational configuration (i.e. configuration to enable operation) from the System Manager 201 via hypertext transfer protocol (HTTP) using a Configurator software component 202.

The YBox 208 has a Heartbeat Agent software component (also known as Heartbeat Agent) 210 that communicates operational status of the YBox 208 to a Venue Instance 212 of one of the venue servers 216. The Venue Instance 212 is designated for Batch 1. The Heartbeat Agent 210 also receives Commands from a Heartbeat Manager software component (also known as Heartbeat Manager) 218 of the Venue Instance 212 and executes them locally on the YBox 208.

The YBox 208 further includes a Scanner software component (also known as a Scanner) 219 for sending reports collated (e.g. the collated report described with reference to FIG. 1) by the YBox 208 (e.g. calibration/Real-Time Location Service (RTLS)/footfall reports) to a Collator 220 of the Venue Instance 212. The Scanner 219 is also responsible for scanning and collecting WiFi data packets transmitted by the mobile devices 204.

The YBox 208 maintains a Report (RP) List 231 of mobile device MAC addresses that are obtained via scans carried out by the YBox 208. The mobile device MAC addresses in the RP List 231 are to be reported to the Collator 220. A scan means activation of the YBox 208 to listen for data packets from the plurality of mobile devices 204 and extraction of the MAC addresses of the mobile devices 204 from the data packets for recording into the RP List 231. The RP List 231 is an example of the third record for containing MAC addresses of the plurality of mobile devices 104, which is described with reference to FIG. 1. Updating of the RP List 231 is carried out in the same manner as how the record residing in the memory 112 in FIG. 1 is updated.

The YBox 208 has a heartbeat communication mode and a scanner mode for communicating with the Venue Instance 212 when the Heartbeat Agent software component 210 and the Scanner software component 219 are in use respectively. Each mode uses a message-queue based protocol called YMQ (YBox Message Queue). In the heartbeat communication mode, the YMQ establishes a Push-Pull (Push-Pull YMQ) communication link that is operating on a push-and-pull basis, i.e. a sender sends out messages, and a receiver receives without sending any acknowledgements. In the scanner mode, the YMQ establishes a Request-Reply (Req-Rep YMQ) communication link that is operating on a request-and-reply basis, i.e. a sender initiates communication by sending a request message, and a receiver always acknowledges by sending a reply message.

Each Venue Instance comprises the same components. For instance, the Venue Instance 212 comprises the Heartbeat Manager 218 that receives heartbeat messages from the YBoxes in Batch 1 and updates the statuses of the YBoxes in Batch 1 to the System Manager 201. The Heartbeat Manager 218 also receives YBox Commands directed to the YBoxes in Batch 1 from the System Manager 201 and sends the YBox Commands to the YBoxes in Batch 1 that are required to execute the YBox commands.

Req-Rep YMQ is used for communications between the Heartbeat Agents (e.g. 210) of the YBoxes, the Heartbeat Managers (e.g. 218) of the Venue Instance(s) of the Venue Servers 216 and a Service Manager 221 of the System Manager 201.

The Venue Instance 212 comprises the Collator 220. The Collator 220 is responsible for receiving reports (e.g. calibration/RTLS/footfall reports) transmitted from the YBoxes 214, for organizing data in the received reports according to MAC addresses of the mobile devices 204 and for generating an observation report for each MAC address that contains the organized data of the MAC address, and for routing each of the generated observation reports to the relevant processors i.e. a Real Time (RT) processor 224, a Footfall (FF) processor 226 and a Calibration (CA) processor 228. Push-Pull YMQ is used for communications between the Collator 220 and the CA RT and FF Processors 224, 226 and 228.

The Venue Instance 212 maintains a CA/RT (calibrate/real-time) list 230 of MAC addresses of the mobile devices 204. This CA/RT list 230 is used for determining which processor (CA, FF or RT) the Collator 220 should route the observation reports to. The CA/RT list 230 is updated by the Heartbeat Manager (e.g. 218) via a Transmission Control Protocol (TCP) link. The Collator 220 accesses the CA/RT list 230 also via a TCP link.

In the present example, the CA Processor 228 is for generating Radio Maps using data in the observation reports and saving them into a CA Database 229 via a TCP link. A radio map may contain data of a list of calibration points for a specific floor of a building. Each calibration point (CP) can be characterized by the following information:

1) XY co-ordinates with respect to horizontal (X) and vertical (Y) axes of a floor plan of the building indicating the physical location of a CP in the form (x, y).

2) A list of MAC addresses of Wireless Access points detected during onsite measurements at the location of a CP in the radio map through one of the mobile devices 204 and a list of mean Received Signal Strength values, mRSS associated with the MAC addresses.

The RT Processor 224 is for computing location of each of the mobile devices 204 using data in the observation report of the corresponding MAC address of the mobile device and for saving the relative computed location coordinates of the mobile device into a RT Database 225 via a TCP link. The coordinates will be used for Real-Time Location Service purposes.

The FF Processor 226 is for computing the location of each of the mobile devices 204 using data in the observation report of the corresponding MAC address of the mobile device and for saving the relative computed location coordinates of the mobile device into the FF Database 227 via a TCP link. The coordinates will be used for footfall analysis of the area 206.

The CA, RT and FF databases 229, 225 and 227 may be further accessed by other devices making use of the data contained in the databases for Calibration, Real-Time Location Service and Footfall analysis purposes respectively.

In the present example, the System Manager 201 is hosted on a separate Linux-based server hardware that is different from the Venue Servers 216. In other examples, the System Manager 201 can also be hosted on the same piece of hardware as one of the Venue Servers 216. The System Manager 201 maintains and manages all the Venue servers 216 and their respective Venue instance(s) in the entire WiFi Positioning System (WPS).

The System Manager 201 comprises the Service Manager 221 that communicates using YMQ with the Heartbeat Managers (e.g. 218) of the Venue Instances of each of the Venue Servers 216. An administrator user of the WPS can send YBox Commands to any one of the YBoxes 214 in any Venue using the Service Manager 221.

Push-Pull YMQ is used for communications between the Scanner software components (e.g. 219) and the Collator 220, and between the Collator 220 and the CA, RT and FF processors 224, 226 and 228.

The System Manager 201 further comprises a Configuration Manager for delivering initial system setup configuration for each YBox to the YBoxes 214 over a HTTP link.

A Calibration Process 300 employing the WiFi Positioning System (WPS) 200 in FIG. 2 will be described as follows with reference to FIGS. 2 and 3.

Firstly, a mobile application for calibration (i.e. a calibration application) is downloaded and installed on a smart phone 302 (i.e. a calibration phone). The calibration phone 302 is one of the mobile devices 204 in FIG. 2. When a user of the calibration phone 302 initiates the calibration application on the calibration phone 302 at a pre-determined location within a coverage area of a batch of YBoxes 318 of the YBoxes 214 in FIG. 2, the MAC address of the calibration phone 302 is sent (1) from the calibration phone 302 to the Service Manager 221 through a HTTP link. Each YBox of the batch of YBoxes 318 is installed in a predetermined location in the coverage area. The HTTP link could be established via a Third Generation (3G) telecommunication network, a General Packet Radio Service (GPRS) data link and the like.

The MAC address of the calibration phone 302 is then transmitted (2) from the Service Manager 221 to a Heartbeat Manager 306 of a Venue Instance 304 in one of the Venue Servers 216 in FIG. 2 through a Req-Rep YMQ link. Thereafter, the Heartbeat Manager 306 adds (7) the MAC address of the calibration phone 302 into a CA/RT List 310 of the Venue Instance 304. At the same time, the MAC address of the calibration phone 302 is packaged into a HB Rep (Heart Beat Reply) Message and sent (3) to a Heartbeat Agent 316 of a YBox in the batch of YBoxes 318 through a Req-Rep YMQ link. The Heartbeat Agents (including 316) of each YBox then add the MAC address into the RP List 320 of the each corresponding YBox.

A Scanner 322 in a YBox of the batch of YBoxes 318 receives (4) packets transmitted by the calibration phone 302 when it is set to scan (or listen) in the area covered by the respective YBox. On receiving packets from the calibration phone 302 in the area covered by the respective YBox, the Scanner 322 generates a corresponding calibration/RTLS report based on the packets received for the calibration phone 302. The generated calibration/RTLS report is then sent (6) from the Scanner 322 to a Collator 308 of the Venue Instance 304 through a Push-Pull YMQ link.

By making reference (8) to the CA/RT List 310, the Collator 308 is able to sort out all the calibration/RTLS reports of the calibration phone 302 received from the batch of YBoxes 318 within the coverage area. These calibration/ RTLS reports are further re-formatted and passed (9) to a CA Processor 312 for the generation of a Radio Map.

All the Scanners in the batch of YBoxes 318 perform the same procedure as the Scanner 322. A representative RSSI reading (e.g. mean RSSI value) observed by each scanner of each one of the batch of YBoxes 318 for the calibration phone 302 is calculated. These representative RSSI readings are then grouped together and associated with the coordinate of the location being calibrated, which is pre-determined and made known to the CA processor 312, to form a Calibration Point (CP).

The calibration process 300 is carried out at all the pre-determined locations for calibration in the coverage area of the batch of YBoxes 318. Finally, a collection of all CPs would form the Radio Map for the specific venue of the coverage area. The Radio Map generated is then stored in a CA Database 314 and can be accessed by the calibration phone 302 through a HTTP link.

Figure 4:
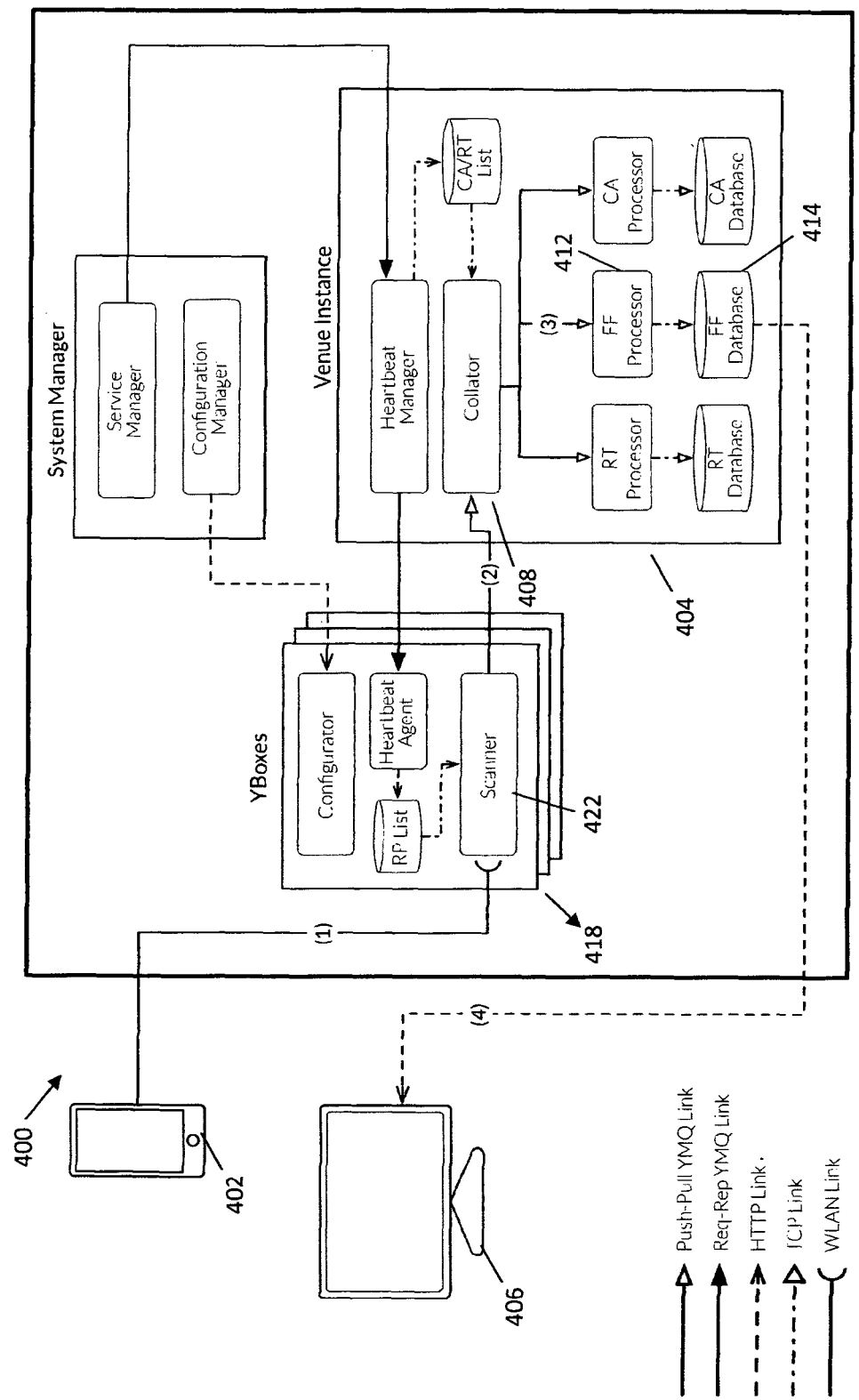
FIG. 4 is a diagram illustrating steps for performing Footfall Tracking by the second example.

A Footfall Tracking process 400 employing the WiFi Positioning System (WPS) 200 in FIG. 2 will be described as follows with reference to FIGS. 2 and 4.

The Footfall Tracking process 400 begins when a WiFi-enabled mobile device 402 appears within a coverage area (e.g. 206 in FIG. 2) of the WPS 200 and the WiFi function of the mobile device 402 is switched on. The mobile device 402 is one of the plurality of mobile devices 204 in FIG. 2.

A Scanner 422 of a YBox in a batch of YBoxes 418 is activated to scan (or listen) and receive (1) WiFi packets transmitted by the mobile device 402 in the coverage area of the batch of YBoxes 418. The Scanner 422 then uses the received packets to generate a Footfall Report and sends the generated Footfall Report (2) to a Collator 408 of a Venue Instance 404 of one of the Venue Servers 216 in FIG. 2 through a Push-Pull YMQ Link.

All the Scanners in the batch of YBoxes 418 perform the same procedure as the Scanner 422. The Collator 408 aggregates all the Footfall Reports received from all the scanners and sorts out the information related to the specific mobile device 402. The sorted out information is then passed (3) to a FF Processor 412 to calculate an estimated location of the mobile device 402 in the coverage area of the batch of YBoxes 418.

The Footfall Tracking process 400 is repeated for all the other mobile devices detected together with the mobile device 402 within the coverage area of the batch of YBoxes 418. The estimated locations collected from carrying out the Footfall Tracking process 400 for all the mobile devices in the coverage area are then used to generate different types of footfall tracking analytics, e.g. gross/unique visitor count, dwelling time of visitors, and popular tracks taken by visitors, etc. The footfall tracking analytics are then stored in a FF Database 414 and is made accessible (4) to a device 406 such as a computer, a tablet computer, a mobile smart phone and the like through a HTTP link.

A Real Time Location Service (RTLS) Tracking process 500 employing the WiFi Positioning System (WPS) 200 in FIG. 2 will be described as follows with reference to FIGS. 2 and 5.

Firstly, a mobile application for RTLS (i.e. RTLS application) is downloaded and installed on a mobile device 502. The mobile device 502 is one of the plurality of mobile devices 204 in FIG. 2. When a user of the mobile device 502 initiates the RTLS application on the mobile device 502 at an arbitrary location within a coverage area of a batch of YBoxes 518 of the YBoxes 214 in FIG. 2, the MAC address of the mobile device 502 is sent (1) from the mobile device 502 to the Service Manager 221 through a HTTP link. Each YBox of the batch of YBoxes 518 is installed in a predetermined location in the coverage area. The HTTP link could be established via a Third Generation (3G) telecommunication network, a General Packet Radio Service (GPRS) data link and the like.

The MAC address of the mobile device 502 is then transmitted (2j from the Service Manager 221 to a Heartbeat Manager 506 of a Venue Instance 504 in one of the Venue Servers 216 in FIG. 2 through a Req-Rep YMQ link. Thereafter, the Heartbeat Manager 506 adds (7) the MAC address of the mobile device 502 into a CA/RT List 510 of the Venue Instance 504. At the same time, the MAC address of the mobile device 502 is packaged into a HB Rep (Heart Beat Reply) Message and sent (3) to a Heartbeat Agent 516 of a YBox in the batch of YBoxes 518 through a Req-Rep YMQ link. The Heartbeat Agents (including 516) of each YBox then add the MAC address into the RP List 520 of the each corresponding YBox.

A Scanner 522 in a YBox of the batch of YBoxes 518 receives (4) packets transmitted by the mobile device 502 when it is set to scan (or listen) in the area covered by the respective YBox. On receiving packets from the mobile device 502 in the area covered by the respective YBox, the Scanner 522 generates a corresponding calibration/RTLS report based on the packets received for the mobile device 502. The generated calibration/RTLS report is then sent (6) from the Scanner 522 to a Collator 508 of the Venue Instance 504 through a Push-Pull YMQ link.

By making reference (8) to the CA/RT List 510, the Collator 508 is able to sort out all the calibration/RTLS reports of the mobile device 502 received from the batch of YBoxes 518 within the coverage area. These calibration/

RTLS reports are further re-formatted and passed (9) to a RT Processor 512 for calculating an estimated location of the mobile device 502 in the coverage area. The estimated location is then stored in a RT database 514 and made accessible (10) to the mobile device 502 through a HTTP link. In this case, the RTLS is simply to make the estimated location of the mobile device 502 available to the mobile device 502. It is appreciated other RTLS may be implemented on top of the described set-up.

The workflow of each scanner, e.g. scanner 219 in FIG. 2, 322 in FIG. 3, 422 in FIGS. 4 and 522 in FIG. 5, of the YBoxes 214 will be described as follows with reference to FIGS. 2 to 6. FIG. 6 shows a workflow example 600 of a scanner for 1 minute (M1).

In the workflow example, scanning (or listening) carried out by each scanner of each YBox in one of the batches of the YBoxes 214 to receive packets from a mobile device in a coverage area of the corresponding YBox is performed every second. In other words, the scanning carried out by the respective scanner during the calibration process 300 in FIG. 3 (calibration scanning), the scanning carried out by the respective scanner during the RTLS Tracking process 500 in FIG. 5, and the scanning carried out by the respective scanner during the Footfall Tracking process 400 in FIG. 4 are performed every second.

A work cycle 612 of 1 minute or 60 seconds (S1-S60) is divided into 10 footfall scanning batches (B1-B10) and each batch contains 6 seconds.

Each second is divided into 2 parts, for instance, in each of the seconds S4 606 ($4^{th}$ second of M1), S15 608 ($15^{th}$ second of M1) and S60 610 ($60^{th}$ second of M1), there is a scanning phase 626 (about 0.9 seconds) and a processing phase 628 (about 0.1 seconds). The scanning phase 626 is further divided into 11 slots, and the scanning for a k-th WiFi channel is performed during a k-th slot, where k is 1, 2 . . . or 11. In each slot of the scanning phase 626, there are 2 parts, a calibration/RTL scanning phase 602 for purposes of the calibration process 300 in FIG. 3 and the RTLS Tracking process 500 in FIG. 5, and a footfall scanning phase 604 for purposes of the Footfall Tracking process 400 in FIG. 4.

All the scanning phases 626 are the same during each of the 60 seconds in M1. The processing phase however executes different tasks during one or more seconds of the 60 seconds in M1. In the present example, there are 3 types of processing phases.

The 3 types of processing phases include the following steps:

- A step 618 of processing (or generating) a Calibration/RTLS report based on packets received during the scanning phase 602 and sending the processed calibration/RTLS report from the scanner to the collator (including e.g. collator 220, 308, 408 and 508 in the previously mentioned Figures) that is carried out every second.
- A step 622 for performing housekeeping. Housekeeping includes but is not limited to hardware checking, runtime logging, memory cleanup, etc.
- A step 620 of sending a footfall report that was processed (or generated) and saved in a previous minute (in this case, M0) that is performed once a minute.
- A step 624 of processing (or generating) and saving a footfall report for the current minute (in this case, M1) based on packets received during the Footfall scanning phase 604 of the current minute (in this case, M1). This saved footfall report would be sent in step 620 of the next minute (i.e. M2).

The processing phases of the first 10 seconds of M1 are classified as type 1. A type 1 processing phase, for example processing phase 614 of S4 606, consists of 3 tasks to be performed. Firstly, processing calibration/RTLS report for S4 and sending the processed calibration/RTLS report for S4 to the collator i.e. step 618. Secondly, sending a footfall report for the previous minute (in this case, M0) i.e. step 620, and thirdly, housekeeping i.e. step 622. In the present example, S4 606 is randomly selected from S1 to S10 to carry out step 620 and step 620 is not carried out during S1-S3 and S5-S10.

The processing phases of the seconds S11-59 are classified as type 2. A type 2 processing phase, for example processing phase 614 of S15 608 consists of 2 tasks to be performed. Firstly, processing calibration/RTLS report for S15 and sending the processed calibration/RTLS report for S15 to the collator i.e. step 618, and secondly, housekeeping i.e. step 622. It is appreciated that the processing phases for S1-S3 and S5-S10 are also classified as type 2.

The processing phase of the second S60 610 is classified as type 3. A type 3 processing phase, for example processing phase 614 of S60 610, consists of 3 tasks to be performed. Firstly, processing calibration/RTLS report for S60 and sending the processed calibration/RTLS report for S60 to the collator i.e. step 618. Secondly, processing and saving a footfall report for the current minute (in this case, M1) i.e. step 624, and thirdly, housekeeping i.e. step 622. It is noted that the footfall report for M1 is processed and saved during S60 610 but it is only sent out in the following minute i.e. M2. Specifically, the footfall report for M1 is sent out during the processing phase of one of the seconds that is randomly selected from the first 10 seconds (S1-S10) of the following minute, M2.

A flowchart 700 for footfall scanning carried out by a scanner of a YBox as described previously, e.g. scanner 219 in FIG. 2, 322 in FIG. 3, 422 in FIGS. 4 and 522 in FIG. 5, during the footfall scanning phases 604 in FIG. 6 is described as follows with reference to FIG. 7.

At step 702, footfall scanning begins for a second Sj on a WiFi channel CHk in the minute M1 (referred in FIG. 6) and in an allocated footfall scanning batch Bi. S, CH, B and M stands for Second, Channel, Batch and Minute respectively. j, k and i are indicative of the number of the Second, Channel and Batch respectively. In this case, there are 10 footfall scanning batches in the minute M1 and 11 WiFi channels. j is a number ranging from 1 to 60, k is a number ranging from 1 to 11 and i is a number ranging from 1 to 10. Each footfall scanning batch has an interval of 6 seconds.

At step 704, the scanner first checks if second Sj is the first second of the footfall scanning batch Bi. More specifically, the scanner checks whether j equals to 6×(i−1)+1.

If the second Sj is the first second of the footfall scanning batch Bi, the scanner creates a Temporary Footfall Record (TFR) for Bi at step 706 before moving on to step 708. The TFR is an example of the record, which is described with reference to FIG. 1.

If the second Sj is not the first second of the footfall scanning batch Bi, the process skips step 706 moves from step 704 to step 708.

At step 708, the scanner checks whether CHk is the first channel that is being scanned in second Sj. More specifically, the scanner checks whether k equals to 1.

If the channel CHk is the first channel that is being scanned in second Sj, the scanner resets a packet count variable, PKT_COUNT, to zero at step 710. Any existing MAC address recorded in the TFR will have a PKT_COUNT variable of zero.

If the channel CHk is not the first channel that is being scanned in second Sj, the process skips step 710 and moves from step 708 to step 712.

At step 712, the scanner is set to listen for WiFi packets transmitted from mobile devices (e.g. mobile devices 204 in FIG. 2, 302 in FIG. 3, 402 in FIGS. 4 and 502 in FIG. 502) in a coverage area of a WPS 200 in FIG. 2. The scanner receives whatever WiFi packets it can detect.

If no WiFi packet is received before the footfall scanning phase expires, the scanning for CHk stops at step 728.

If a WiFi packet is received, the header of the received packet is decoded by the respective YBox of the scanner at step 714.

After decoding at step 714, the scanner determines whether the received packet originated from a mobile device, as opposed to a packet from another YBox or other fixed WiFi access points, based on the source and destination information in the header of the packet at step 716.

If the received packet does not originate from a mobile device, the packet is discarded at step 718 and the process moves from step 718 back to step 712.

If the received packet originates from a mobile device, the scanner checks whether the MAC address is already in the TFR of the current footfall scanning batch Bi at step 720.

If the MAC address of the received packet is not in the TFR of the current footfall scanning batch Bi, the scanner adds the MAC address to the TFR of the current footfall scanning batch Bi. At the same time, the detected RSSI of the received packet is recorded in the TFR of the current footfall scanning batch Bi, and the PKT_COUNT variable is increased by 1 for the MAC address at step 722. It is noted that any MAC address newly added into the TFR at step 722 will begin with a PKT_COUNT variable of zero, which will then be increased by 1. After step 722, the process returns to step 712.

If the MAC address of the packet is already in the TFR of the current footfall scanning batch Bi, the scanner checks whether PKT_COUNT variable has reached 5 for the MAC address at step 724. It is appreciated that 5 counts is just an example. A higher or lower count could be set depending on the time period of the scanning phase and the level of accuracy required for the footfall scanning process.

If the PKT_COUNT variable has reached 5 for the MAC address at step 724, the received packet is discarded at step 718 and the process moves from step 718 back to step 712.

If the PKT_COUNT variable has not reached 5 for the MAC address at step 724, the scanner appends the detected RSSI of the received packet to the TFR of the current footfall scanning batch Bi for the MAC address, and PKT_COUNT variable is increased by 1 for the MAC address at step 726. After step 726, the process returns to step 712.

Figure 7:
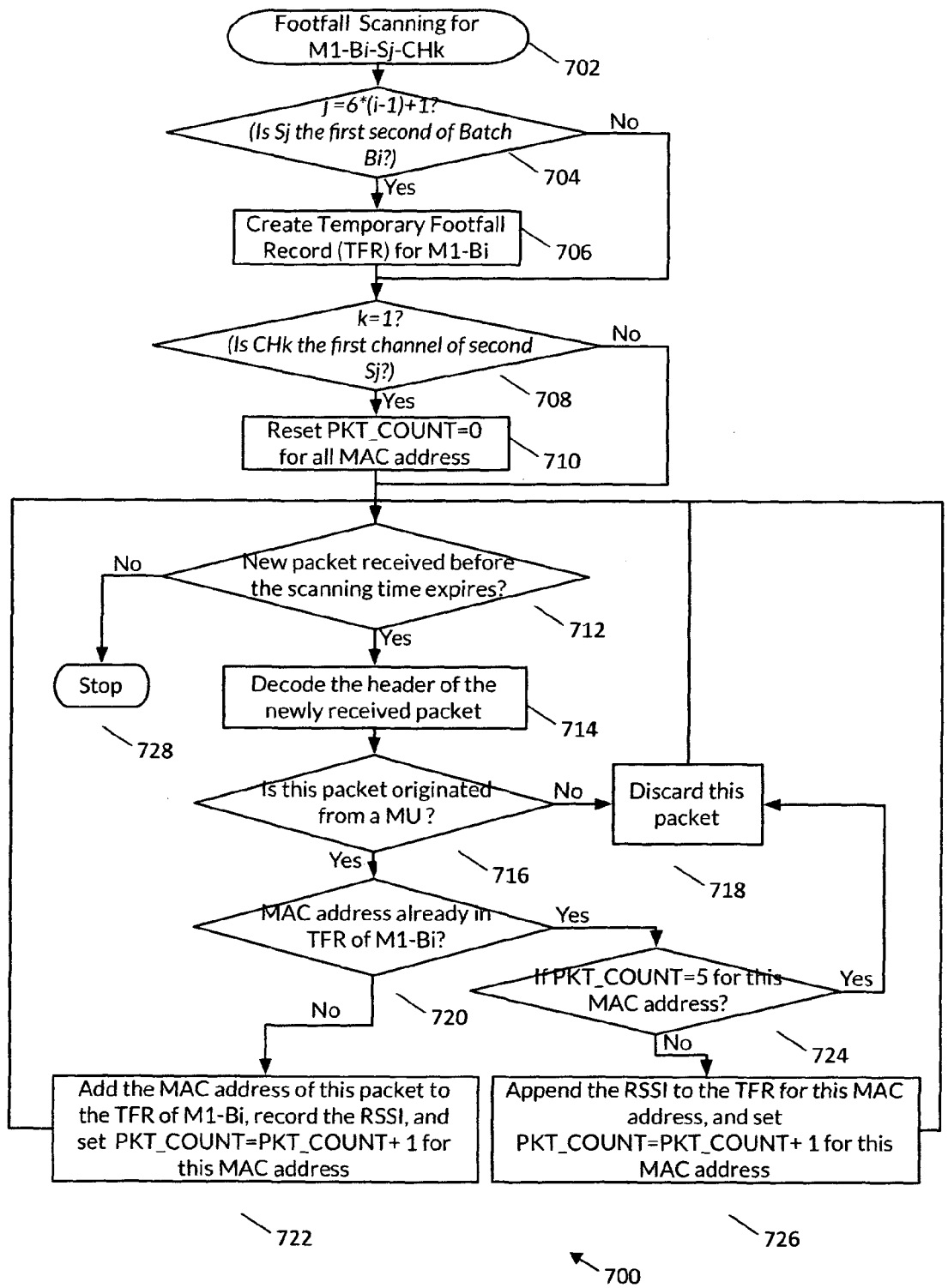
FIG. 7 is a flowchart for a footfall scanning process of an example of the present invention.

An example illustrating the organization of the data of a Temporary Footfall Record (TFR) described with reference to FIG. 7 is shown in FIG. 8.

FIG. 8 shows a TFR 800 of an i-th batch (Bi) in a minute M1 (representative symbol: M1-Bi).

The TFR 800 is in the form of a table with a first row from the top 804 of the TFR 800 indicating the number of RSSI readings obtained for certain MAC addresses. The first column from the left 806 of the TFR 800 indicates the MAC addresses recorded in the TFR 800. Each of the spaces in the table besides the first row from the top 804 and the first column from the left 806 of the TFR 800 indicates the value of the RSSI reading obtained during each RSSI reading for a respective MAC address.

For each MAC address, at most 5 RSSI readings are recorded in 1 second. Therefore, at most 30 RSSI readings are recorded during M1-Bi (i.e. within 6 seconds). It may be configured such that when the value of an RSSI reading for a' certain MAC address is smaller than a predetermined number, the reading would be recorded as "Nil" in the TFR 800. It may also be configured such that when the total number of collected RSSI readings is smaller than a predetermined number, i.e. 5 in this case, the vacancies in the TFR 800 that has not been recorded with one of the collected RSSI readings would be recorded as "Nil".

In the TFR 800, there is shown 4 blocks 808, 810, 812 and 814 of RSSI Readings with corresponding recorded RSSI values for N number of MAC addresses recorded in the TFR 800 i.e. MAC1, MAC2, MAC3, . . . , MACN. Each block comprises 5 RSSI Readings. Block 808 is collected during a second Sj in a minute M1 for a footfall scanning batch Bi (representative symbol: M1-Bi-Sj) where j=6×(i−1)+1. Block 810 is collected during a second Sj in a minute M1 for a footfall scanning batch Bi (representative symbol: M1-Bi-Sj) where j=6×(i−1)+2. Block 812 is collected during a second Sj in a minute M1 for a footfall scanning batch Bi (representative symbol: M1-Bi-Sj) where j=6×(i−1)+5. Block 814 is collected during a second Sj in a minute M1 for a footfall scanning batch Bi (representative symbol: M1-Bi-Sj) where j=6×(i−1)+6.

A process 900 carried out by each scanner, e.g. scanner 219 in FIG. 2, 322 in FIG. 3, 422 in FIGS. 4 and 522 in FIG. 5, of the YBoxes 214 in FIG. 2 during step 624 in FIG. 6 for processing a footfall report for a minute M1 will be described as follows with reference to FIGS. 6 and 9.

Processing of a footfall report for a minute M1 begins at step 902.

At step 904, the scanner of a respective YBox combines all the TFRs created in all the 10 footfall scanning batches i.e. M1-B1, M1-B2, . . . , M1-B10 of the work cycle 612 in FIG. 6 and collates the MAC addresses that appear in all the TFRs at least once into a Footfall List for M1. In mathematical terms, the union of the MAC addresses in the TFR of M1-Bi for i is an element of {1, 2, . . . , 10} is defined.

After step 904, the scanner calculates for each MAC address in the Footfall List a representative RSSI value for each of the footfall scanning batches by looping step 906. In the present example, the representative RSSI value is a truncated mean value.

Each loop of step 906 calculates the truncated mean value of the RSSI readings corresponding to each MAC address in the Footfall List for one footfall scanning batch. The truncated mean value is calculated by taking average of the remaining RSSI readings of the MAC address after discarding "Nil" readings and the maximum and minimum RSSI readings in the RSSI readings of the MAC address for the footfall scanning batch.

Step 906 loops until all the MAC addresses in the Footfall list have each obtained a representative RSSI value for each of the 10 footfall scanning batches. After obtaining each representative RSSI value, it is recorded based on two scenarios. In the first scenario, if a MAC address in the Footfall list does not appear in the TFR for a specific footfall scanning batch, the representative RSSI value of this MAC address for this footfall scanning batch will be marked as "Nil". In the second scenario, if a MAC address in the Footfall list is found in the TFR for a specific footfall scanning batch, the truncated mean of the RSSI readings of this MAC address in this TFR is calculated and assigned as the representative RSSI value of this MAC address for this footfall scanning batch.

After step 906 have completed looping, the 10 representative RSSI values corresponding to the 10 footfall scanning batches for all the MAC addresses in the Footfall List of M1 and the MAC addresses are consolidated and recorded into a footfall report for the minute M1 at step 908.

Figure 9:
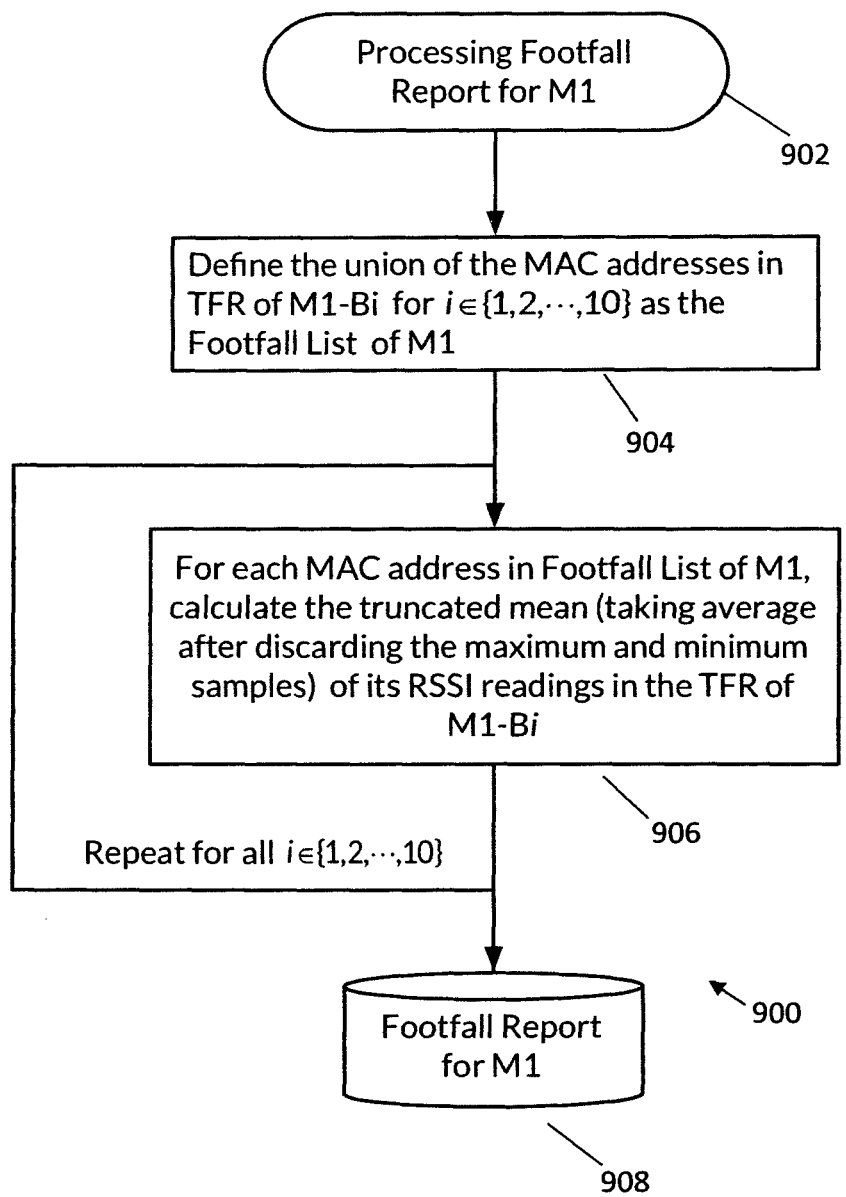
FIG. 9 is a flowchart for processing a Footfall Report of an example of the present invention.
Figure 10:
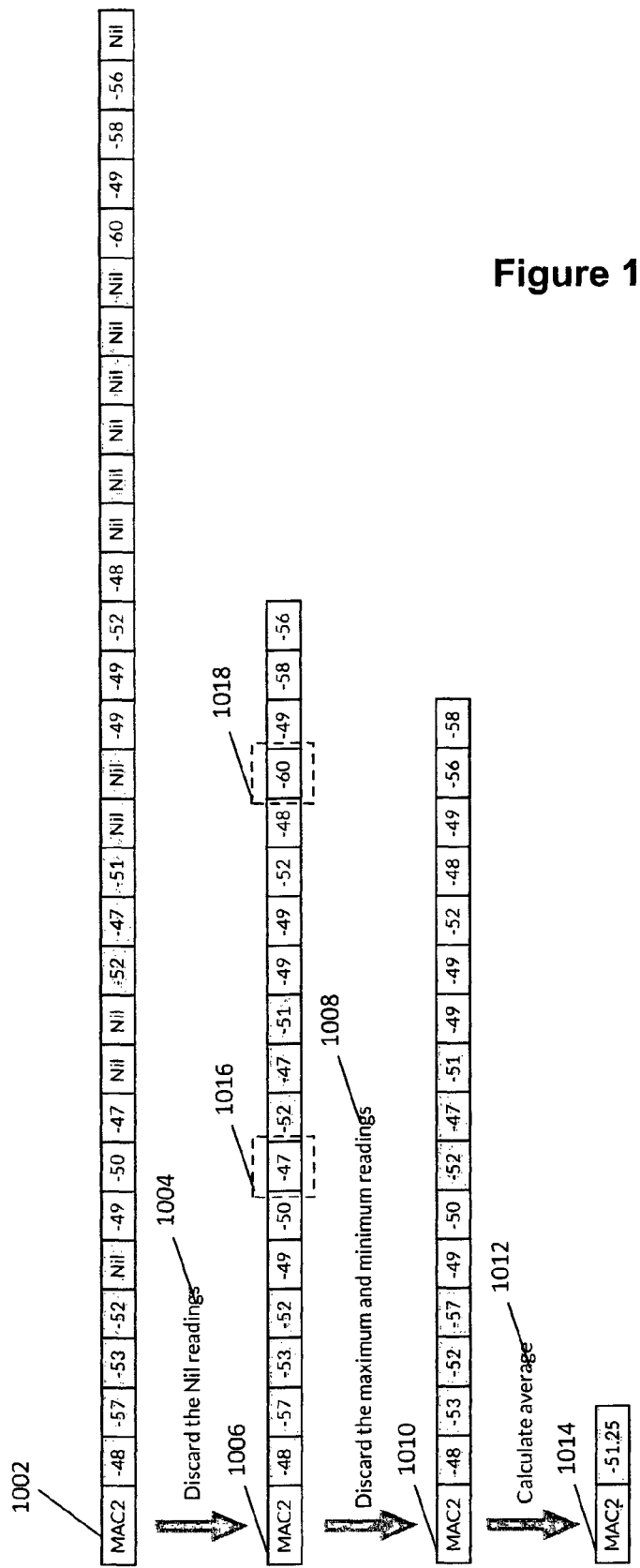
FIG. 10 illustrates calculation of a truncated mean value required in an example of the present invention.

An example of the calculation of the truncated mean at step 906 in FIG. 9 is described as follows with reference to FIG. 10.

A row 1002 extracted from a TFR shows the RSSI readings collected for a MAC address, MAC2.

In a first step 1004, all the "Nil" readings recorded in the row 1002 are discarded. The row 1002 will be reduced to a row 1006 without "Nil" readings.

Thereafter, in a second step 1008, the maximum RSSI reading, for example −47 (1016 in FIG. 10), and the minimum RSSI reading, for example −60 (1018 in FIG. 10), in the row 1006 are discarded. The row 1006 will be further reduced to a row 1010 without the maximum and minimum RSSI readings. If the number of RSSI readings after performing the first step 1004 is less than or equal to 2, the second step 1008 will not be carried out.

In a third step 1012 after the second step 1008, the arithmetic average of the remaining RSSI readings in the reduced row 1010 is then calculated to generate the truncated mean of the RSSI readings of MAC2. The row 1010 will be reduced to a row 1014 with just the truncated mean value.

An example illustrating the organization of the data of a footfall report 1100 for a minute M1 that is generated at step 908 in FIG. 9 is illustrated in FIG. 11.

It is observed that each MAC address i.e. MAC1, MAC2, MAC3, . . . , or MACN 1102 in FIG. 11 in the footfall report 900 is associated with 10 representative RSSI values 1104. Each of the RSSI values corresponds with a footfall scanning batch i.e. Batch No. 1 to 10 (1106 in FIG. 11) in M1.

A flowchart 1200 for Calibration/RTLS scanning carried out by a scanner of a YBox as described previously, e.g. scanner 219 in FIG. 2, 322 in FIG. 3, 422 in FIGS. 4 and 522 in FIG. 5, during the Calibration/RTLS scanning phases 602 in FIG. 6 is described as follows with reference to FIG. 12.

At step 1202, Calibration/RTLS scanning begins for a current second Sj on a WiFi channel CHk in the minute M1 (referred in FIG. 6). S, CH, and M stand for Second, Channel, and Minute respectively. j and k are indicative of the number of the Second and Channel respectively. As mentioned previously, there are 11 WiFi channels in the present example. j is a number ranging from 1 to 60 and k is a number ranging from 1 to 11.

At step 1204, the scanner first checks if channel CHk is the first channel for the scanner to conduct scanning in the current second Sj. More specifically, the scanner checks whether k equals to 1.

If the channel CHk is the first channel for the scanner to conduct scanning in the current second Sj, the scanner creates a Temporary Calibration/RTLS Record (TCRR) for the current second Sj of the minute M1, M1-Sj, at step 1206 before moving on to step 1208.

The TCRR is an example of the second record, which is described with reference to FIG. 1.

If the channel CHk is the first channel for the scanner to conduct scanning in the current second Sj, the process skips step 1206 moves from step 1204 to step 1208.

At step 1208, the scanner is set to listen for WiFi packets transmitted from mobile devices (e.g. mobile devices 204 in FIG. 2, 302 in FIG. 3, 402 in FIGS. 4 and 502 in FIG. 502) in a coverage area of a WPS 200 in FIG. 2. The scanner receives whatever WiFi packets it can detect.

If no WiFi packet is received before a predetermined sampling time expires, the scanning for CHk stops at step 1220.

If a WiFi packet is received, the header of the received packet is decoded by the respective YBox of the scanner at step 1210.

After decoding at step 1210, the scanner determines whether the received packet originated from a mobile device, as opposed to a packet from another YBox or other fixed WiFi access points, based on the source and destination information in the header of the packet at step 1212.

If the received packet does not originate from a mobile device, the packet is discarded at step 1222 and the process moves from step 1222 back to step 1208.

Figure 3:
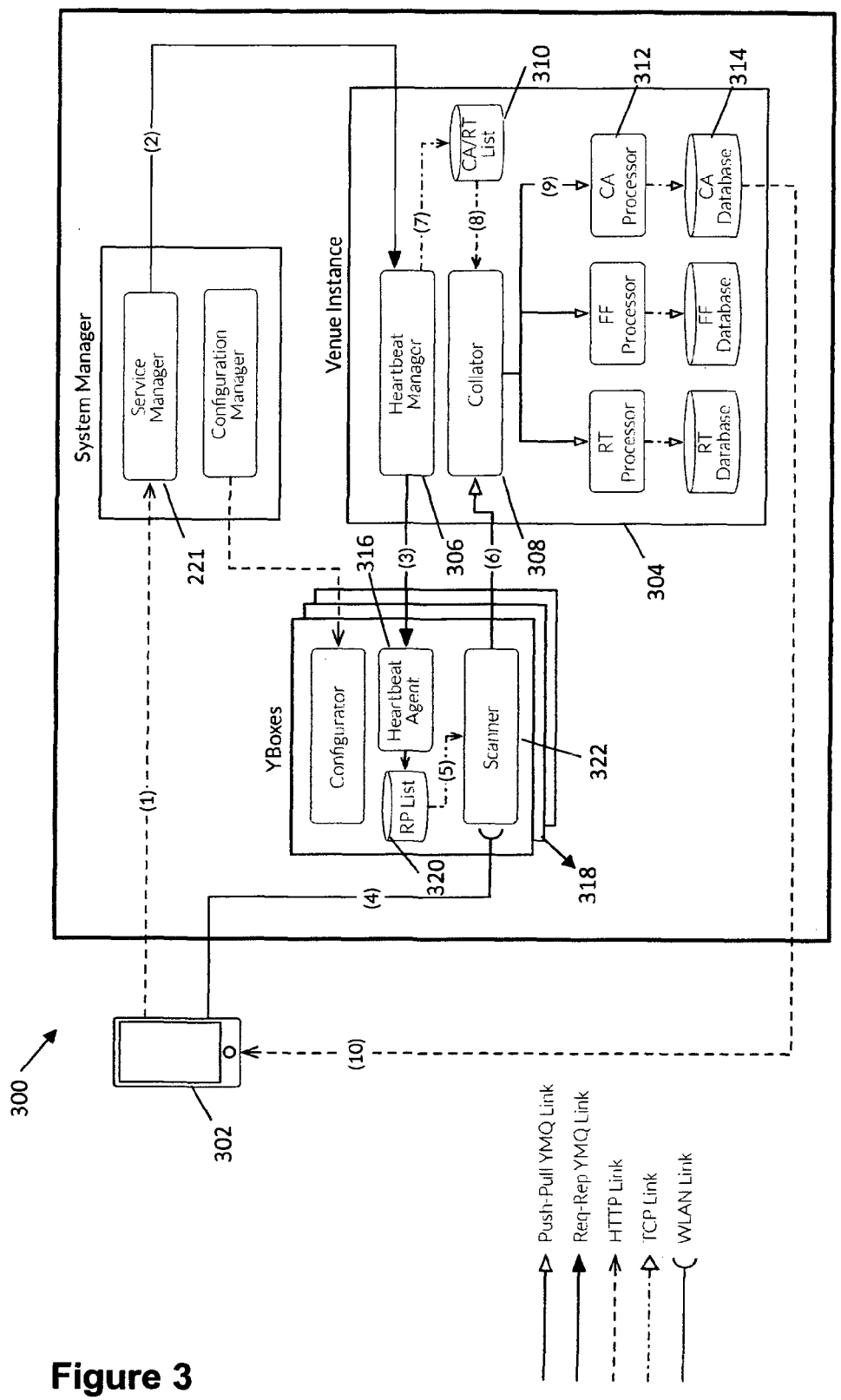
FIG. 3 is a diagram illustrating steps for performing calibration by the second example.
Figure 5:
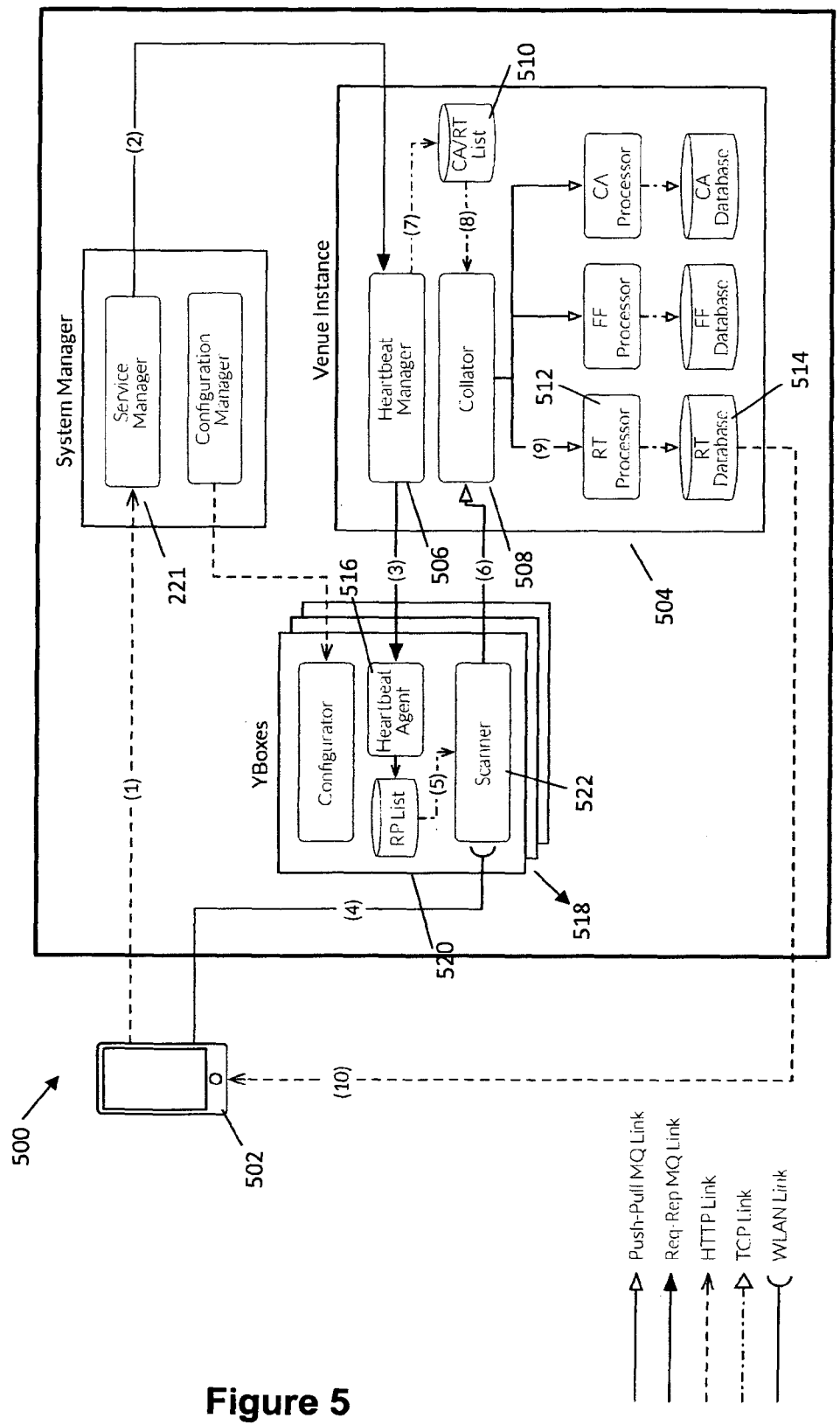
FIG. 5 is a diagram illustrating steps performed for Real Time Location Service (RTLS) by the second example.
Figure 6:
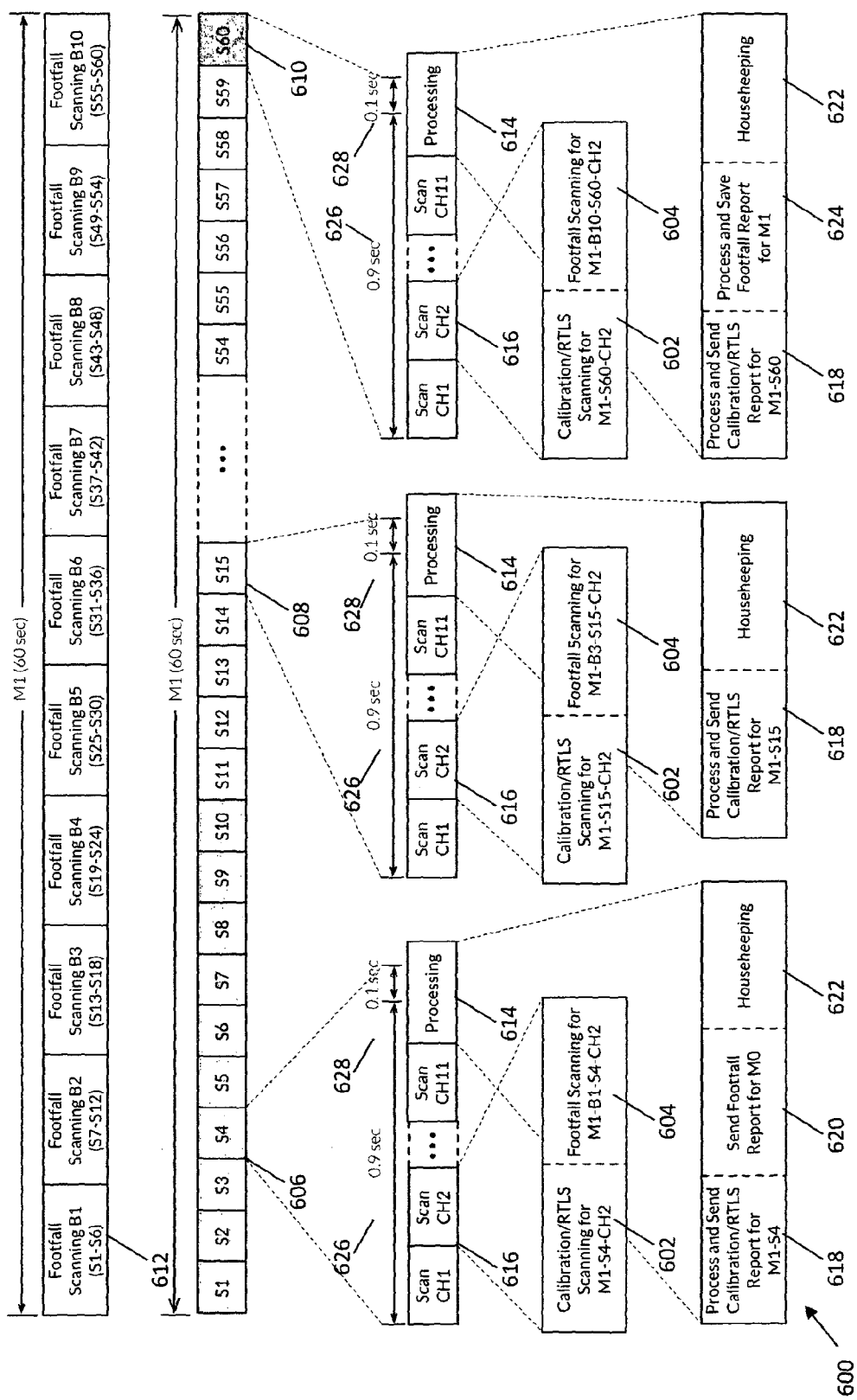
FIG. 6 is a diagram illustrating the workflow of a scanner of the second example.

If the received packet originates from a mobile device, the scanner checks whether the MAC address is already in an RP List 1224, e.g. 231 in FIG. 2, 320 in FIGS. 3 and 520 in FIG. 5, of the YBox at step 1214.

If the MAC address of the received packet is not in the RP List 1224, the received packet is discarded at step 1222 and the process moves from step 1222 back to step 1208.

If the MAC address of the packet is in the RP List 1224, the scanner further checks if the number of RSSI readings collected for this MAC address in the TCRR is greater than or equal to 7 at step 1216. It is appreciated that 7 is just an example. A higher or lower number could be set depending on the time period of the scanning phase and the level of accuracy required for the calibration/RTLS scanning process.

If the number of RSSI readings collected for this MAC address in the TCRR is greater than or equal to 7 at step 1216, the received packet is discarded at step 1222 and the process moves from step 1222 back to step 1208.

If the number of RSSI readings collected for this MAC address in the TCRR is lesser than 7 at step 1216, the scanner records the MAC address and the detected RSSI of the received packet into the TCRR of Sj at step 1218. After step 1218, the process returns to step 1208.

Figure 12:
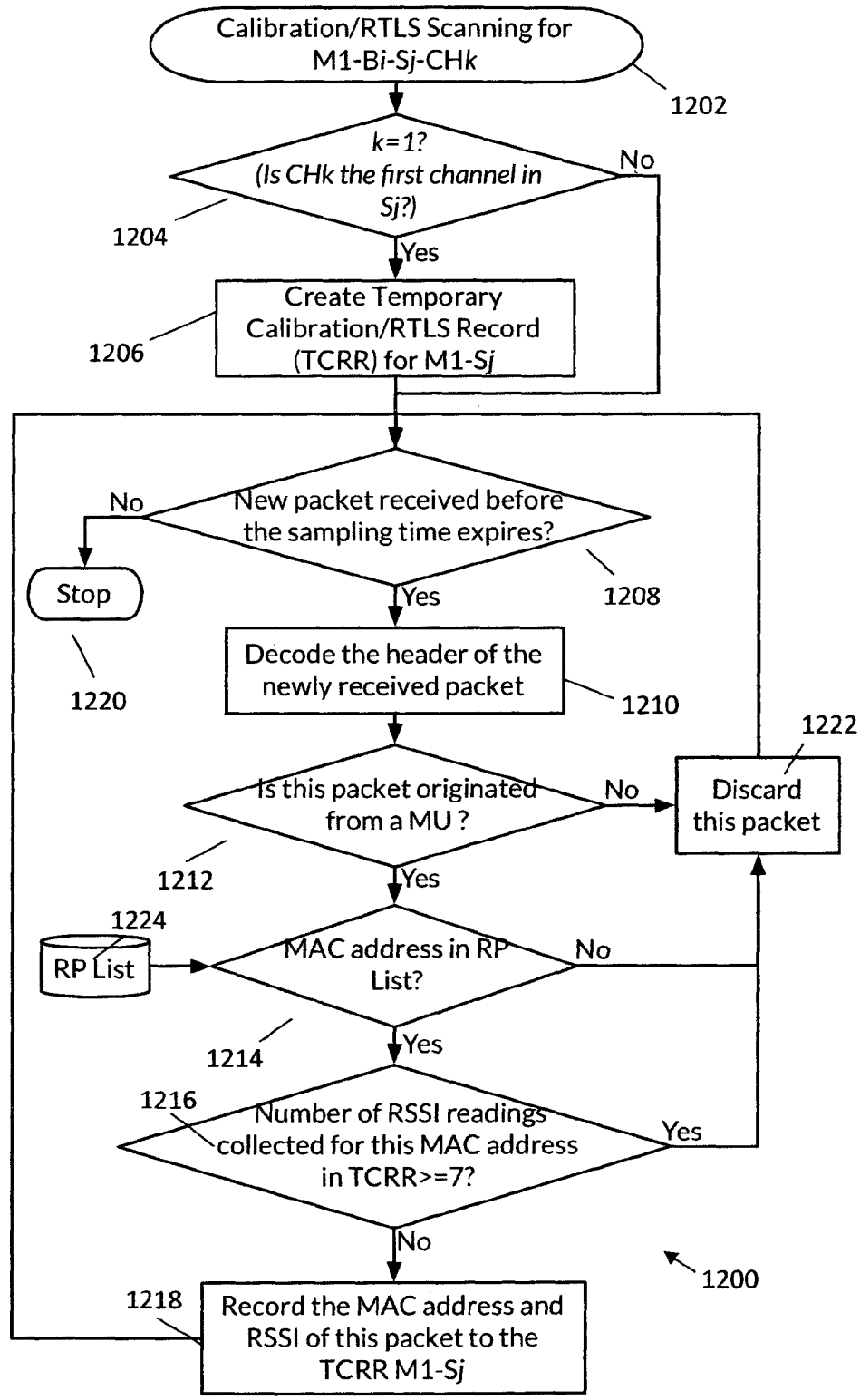
FIG. 12 is a flowchart for a Calibration/RTLS scanning process of an example of the present invention.
Figures 13, 14:
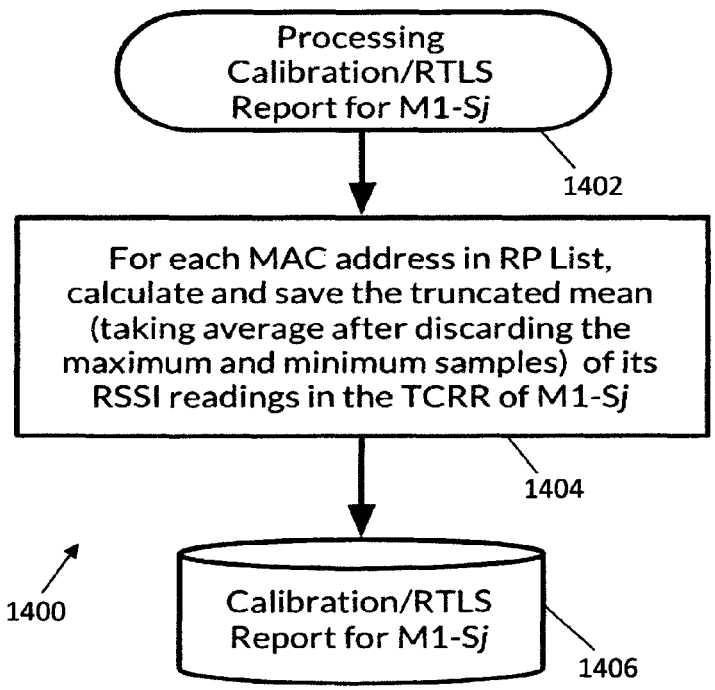
FIG. 13 shows an example of a Temporary Calibration/RTLS Record of an example of the present invention.
FIG. 14 is a flowchart for processing a Calibration/RTLS Report of an example of the present invention.

An example illustrating the organization of the data of a Temporary Calibration/RTLS Record (TCRR) described with reference to FIG. 12 is shown in FIG. 13.

FIG. 13 shows a TCRR 1300 of a second Sj in a minute M1 (representative symbol: M1-Sj).

The TCRR 1300 is in the form of a table with a first row from the top 1304 of the TCRR 1300 indicating the number of RSSI readings obtained for certain MAC addresses. The first column from the left 1302 of the TCRR 1300 indicates the MAC addresses recorded in the TCRR 1300. Each of the spaces in the table besides the first row from the top 1304 and the first column from the left 1302 of the TCRR 1300 indicates the value of the RSSI reading obtained during each RSSI reading for a respective MAC address.

For each MAC address, at most 7 RSSI readings are recorded in 1 second as limited by step 1216 in FIG. 12. When the value of an RSSI reading for a certain MAC address is smaller than a predetermined number, the reading would be recorded as "Nil" in the TCRR 1300.

A process 1300 carried out by each scanner, e.g. scanner 219 in FIG. 2, 322 in FIG. 3, 422 in FIGS. 4 and 522 in FIG. 5, of the YBoxes 214 in FIG. 2 during step 618 in FIG. 6 for processing a calibration/RTLS report for a minute M1 will be described as follows with reference to FIGS. 6 and 14.

Processing of a calibration/RTLS report for a second Sj in a minute M1 (M1-Sj) begins at step 1402.

After step 1404, the scanner calculates for each MAC address in the RP List a representative RSSI value for the second Sj in minute M1 (M1-Sj). In the present example, the representative RSSI value is a truncated mean value.

Step 1404 calculates the truncated mean value of the RSSI readings in the TCRR of the second Sj in the minute M1 (i.e. M1-Sj) that are corresponding to each MAC address in the RP List. The truncated mean value is calculated by taking average of the remaining RSSI readings of the MAC address after discarding "Nil" readings and the maximum and minimum RSSI readings in the RSSI readings of the MAC address.

Step 1404 records the representative RSSI value based on two scenarios. In the first scenario, if a MAC address in the RP List does not appear in the TCRR of M1-Sj, the representative RSSI value of this MAC address for M1-Sj will be marked as "Nil". In the second scenario, if a MAC address in the RP List is found in the TCRR of M1-Sj, the truncated mean of the RSSI readings of this MAC address in this TCRR is calculated and assigned as the representative RSSI value of this MAC address for M1-Sj.

After step 1404, the representative RSSI values calculated for all MAC address in the RP List are consolidated to generate the Calibration/RTLS Report of M1-Sj at step 908.

Figures 15, 16:
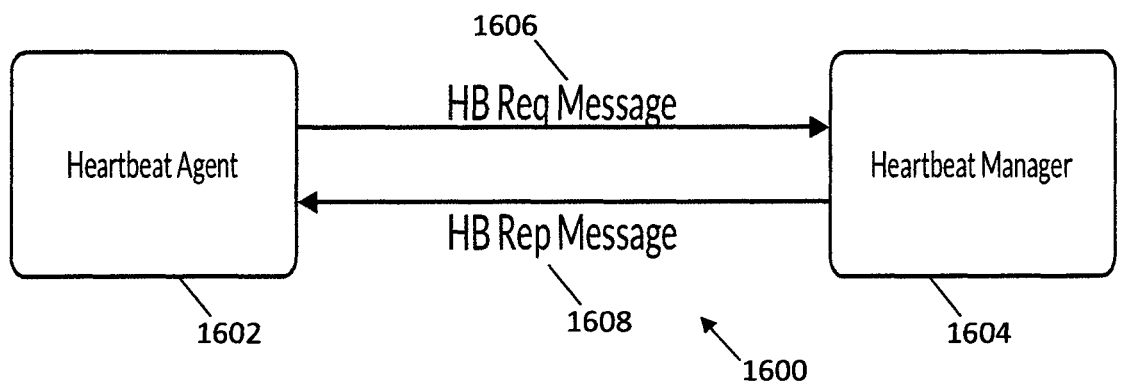
FIG. 15 shows an example of a Calibration/RTLS Report of an example of the present invention.
FIG. 16 illustrates communications between a Heartbeat Agent and a Heartbeat Manager of an example of the present invention.

An example illustrating the organization of the data of a calibration/RTLS report 1500 for a second Sj in a minute M1 that is generated at step 1406 in FIG. 14 is illustrated in FIG. 15. The calibration/RTLS report 1500 consists of two columns, a MAC address column 1502 for containing MAC addresses and a RSSI Readings column 1504 for containing representative RSSI values corresponding to the MAC addresses.

It is observed that each MAC address i.e. MAC1, MAC2, MAC3, . . . , or MACN in the MAC address column 1502 is associated with one corresponding representative RSSI value in the RSSI Readings column 1504.

FIG. 16 illustrates communications between a Heartbeat Agent 1602 (e.g. 210 in FIG. 2, 316 in FIG. 3, and 516 in FIG. 5) in one of the YBoxes 214 in FIG. 2 and a Heartbeat Manager 1604 (e.g. 218 in FIG. 2, 306 in FIG. 3, and 506 in FIG. 5) of a Venue Instance, e.g. 212 in FIG. 2, 304 in FIG. 3, and 504 in FIG. 5.

The Heartbeat Agent 1602 communicates with the Heartbeat Manager 1604 through a Request/Repeat (Req/Rep) YMQ Link. The Heartbeat Agent 1602 firstly initiates the communication by sending a Heartbeat (HB) Request (Req) Message 1606. The Heartbeat Manager 1604 acknowledges the reception of the HB Req Message 1606 by sending a Heartbeat (HB) Reply (Rep) Message 1608. In this example, the HB Rep Message 1608 may include a YMQ Command for the Heartbeat Agent 1602 to execute and the HB Req Message 1606 may include an acknowledgement to the previous YMQ Command that the Heartbeat Agent 1602 is to execute or had executed.

Figure 17:
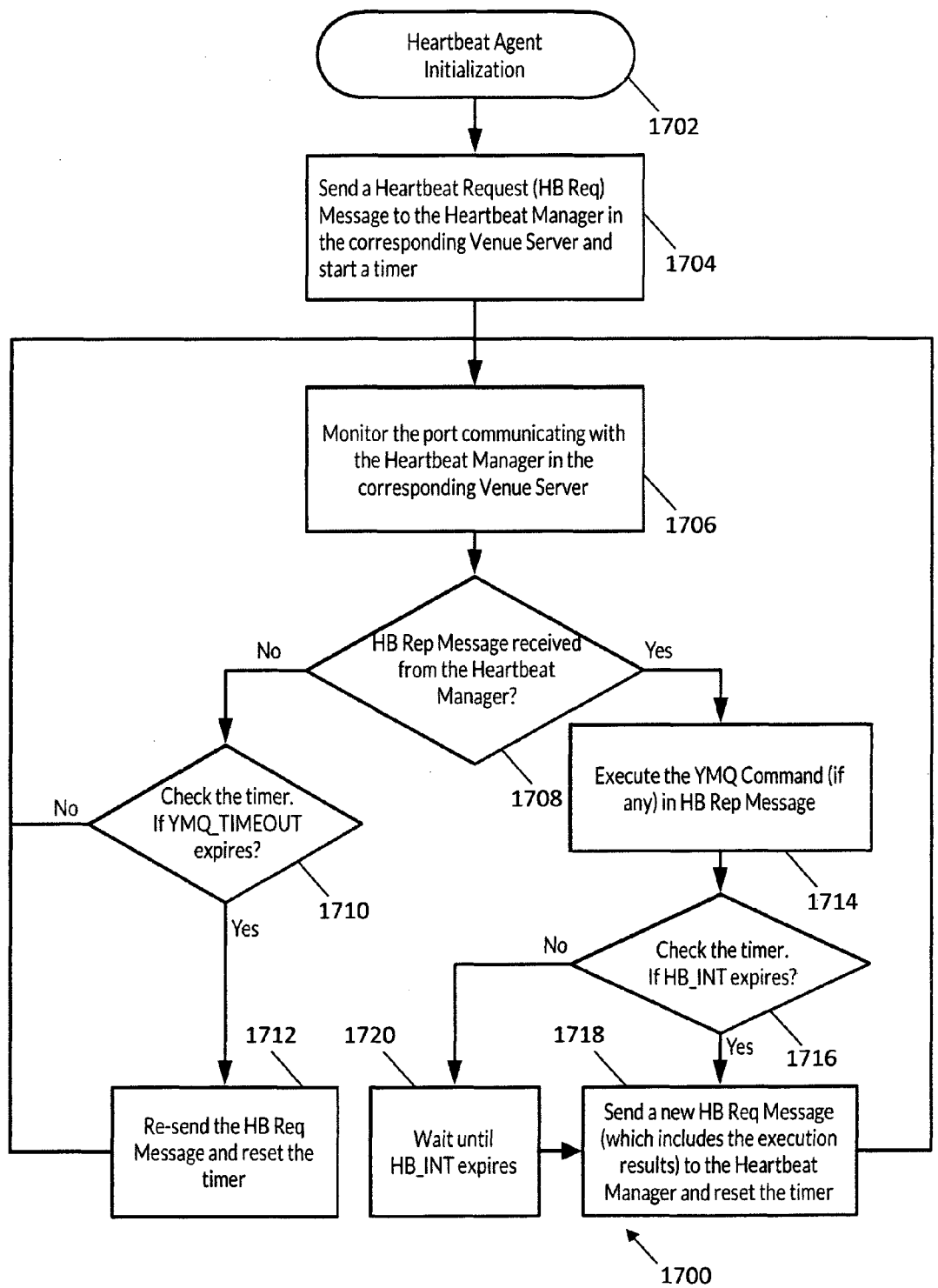
FIG. 17 is a flowchart showing a workflow of the Heartbeat Agent of an example of the present invention.

A flowchart 1700 of the workflow of the Heartbeat Agent 1602, which is the same as 210 in FIG. 2, 316 in FIG. 3, and 516 in FIG. 5, is described as follows with reference to FIGS. 16 and 17.

After initialization (i.e. set up for normal operation) at step 1702, the Heartbeat Agent 1602 sends a HB Req Message 1606 to the Heartbeat Manager 1604 in a corresponding Venue Server (i.e. one of the Venue Servers 216 in FIG. 2) at step 1704. At the same time, the Heartbeat Agent 1602 starts a timer. The HB Req Message 1606 may include an acknowledgement to a previous YMQ Command that the Heartbeat Agent 1602 is to execute or had executed.

The Heartbeat Agent 1602 then at step 1706 keeps monitoring the port of the respective YBox of the Heartbeat Agent 1602 that is used to communicate with the Heartbeat Manager 1604 in the corresponding Venue Server at step 1706.

When monitoring the port, the Heartbeat Agent 1602 checks whether a HB Rep Message 1608 is received from the Heartbeat Manager 1604 at step 1708.

If a HB Rep Message 1608 is received from the Heartbeat Manager 1604 at step 1708, the YMQ Command in the HB Rep Message 1608, if any, will be executed at step 1714.

After execution of the YMQ Command or directly after a HB Rep Message 1608 is received from the Heartbeat Manager 1604 in the absence of a YMQ Command, the Heartbeat Agent checks the timer at step 1716.

If a pre-determined time period HB_INT has expired, the Heartbeat Agent 1602 sends a new HB Req Message 1606 together with the execution results of the YMQ Command, if any, at step 1718. At the same time, the Heartbeat Agent 1602 rests the timer. In the present example, HB_INT is the minimum time interval allowed between 2 consecutive HB Req Messages sent by the Heartbeat Agent 1602.

If the pre-determined time period HB_INT has not expired at step 1716, the Heartbeat Agent 1602 will wait until HB_INT expires at step 1720 before moving to step 1718.

If a HB Rep Message 1608 is not received from the Heartbeat Manager 1604 at step 1708, the Heartbeat Agent 1602 will check the timer at step 1710.

If a pre-determined time period YMQ_TIMEOUT has expired, the Heartbeat Agent 1602 will re-send the HB Req Message 1606 and reset the timer at step 1712. After step 1712, the process will move from step 1712 to step 1706.

If a pre-determined time period YMQ_TIMEOUT has not expired, the process will move from step 1710 to step 1706.

Figure 18:
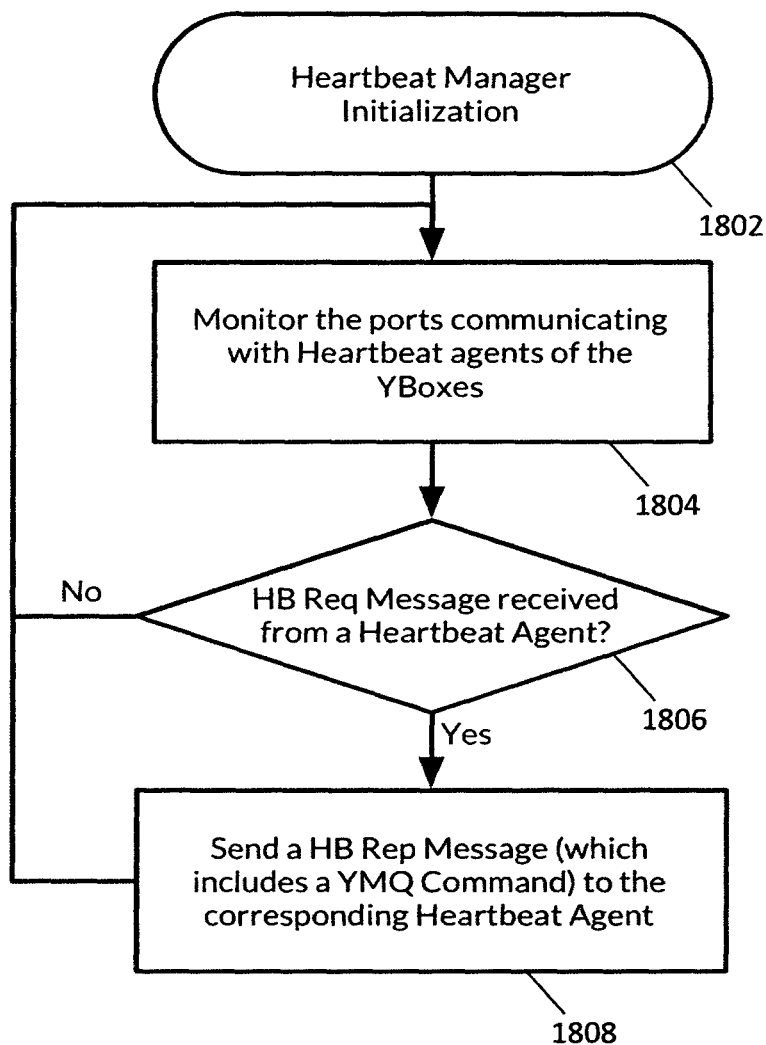
FIG. 18 is a flowchart showing a workflow of the Heartbeat Manager of an example of the present invention.

A flowchart 1800 of the workflow of the Heartbeat Manager 1604 in FIG. 16, which is the same as 218 in FIG. 2, 306 in FIG. 3, and 506 in FIG. 5, is described as follows with reference to FIGS. 16 and 18.

After initialization (i.e. set up for normal operation) at step 1802, the Heartbeat Manager 1604 keeps monitoring the port of the respective Venue Server that is used to communicate with one or more the Heartbeat Agents of the YBoxes 214 in FIG. 2 at step 1804. The respective Venue Server as mentioned is hosting the Venue Instance that comprises the Heartbeat Manager 1604.

When monitoring the port, the Heartbeat Manager 1604 checks whether a HB Req Message 1606 is received from a Heartbeat Agent, e.g. 1602 in FIG. 16, at step 1806.

If a HB Req Message 1606 is received from a Heartbeat Agent, e.g. 1602 in FIG. 16, at step 1806, the Heartbeat Manager 1604 will send a HB Rep Message 1608, which may include a YMQ Command to be executed by that Heartbeat Agent, to that Heartbeat Agent at step 1808.

If a HB Req Message 1606 is not received from a Heartbeat Agent, e.g. 1602 in FIG. 16, at step 1806, the process moves from step 1806 to step 1804.

An example of a Heartbeat (HB) Request (Req) Message 1606 in FIG. 16 is described with reference to FIGS. 16 and 19 as follows.

Each HB Req Message 1606 consists of 2 parts, a header portion 1902 and a payload portion 1904.

The header portion 1902 consists of the following 4 domains:

Type 1904 (in this case, 2 Bytes size), which is an indicator of the type of this message ("HB" indicates that this is a Heartbeat message).

Ver. 1906 (in this case, 1 Byte size), which indicates version of the YMQ protocol.

Timestamp 1908 (in this case, 4 Bytes size), which indicates the time (if based on UNIX system, the UNIX time) when the HB Req Message 1606 is sent.

Size of payload 1914 (in this case, 2 Bytes size), which indicates the size of the payload portion 1904 in Bytes.

The payload portion 1904 consists of 2 parts:

YBox ID (in this case, 3 Bytes size), which is the unique ID of the YBox that the Heartbeat Agent belongs to.

The acknowledgement part 1914 (in this case, up to 69 Bytes size), which is an optional part for providing acknowledgement to a previous YMQ Command. The acknowledgement part 1914 consists of the following 3 domains:

1) Time Reference 1916 (in this case, 4 Bytes size), which is the timestamp of an earlier HB Rep Message 1608 that is carrying the YMQ Command being acknowledged.
2) Status 1918 (in this case, up to 69 Bytes size), which is an indicator showing whether a YMQ Message has been successfully executed.
3) The detailed execution results part 1920 (in this case, up to 64 Bytes size), which is for indicating execution results for a previous YMQ Command.

Figure 19:
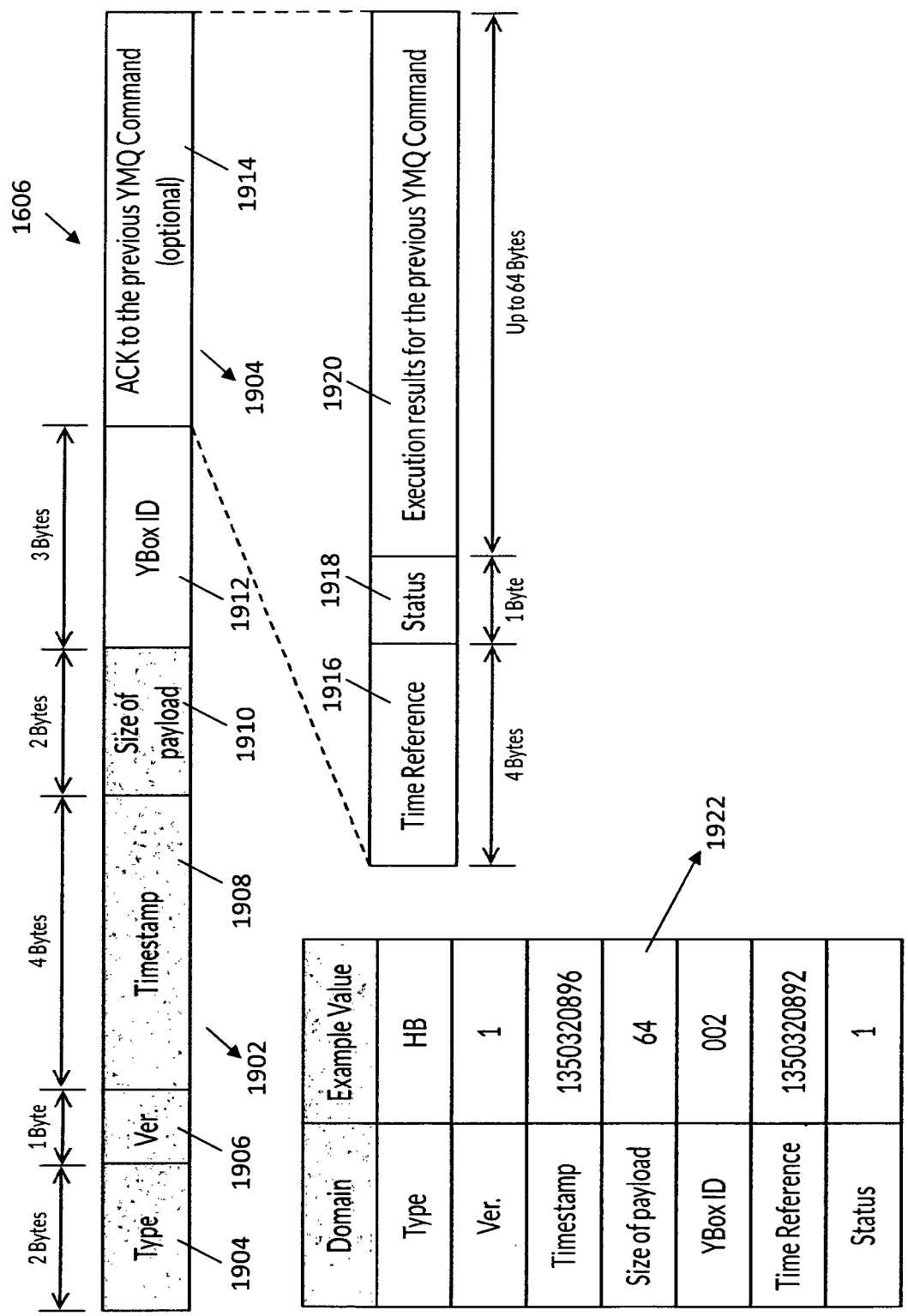
FIG. 19 shows an example of a Heartbeat (HB) Request (Req) Message communicated between the Heartbeat Agent and the Heartbeat Manager.

Table 1922 in FIG. 19 shows example values for each of the domains in the HB Req Message 1606.

An example of a Heartbeat (HB) Reply (Rep) Message 1608 in FIG. 16 is described with reference to FIGS. 16 and 20 as follows.

Each HB Rep Message 1608 consists of 2 parts, a header portion 2018 and the payload portion 2020.

The header consists of following 4 domains:

Type 2002 (in this case, 2 Bytes size), which is an indicator of the type of this message ("HB" indicates that this is a Heartbeat message).

Ver. 2004 (in this case, 1 Byte size), which indicates version of the YMQ protocol.

Timestamp 2006 (in this case, 4 Bytes size), which indicates the time (if based on UNIX system, the UNIX time) when the HB Rep Message 1608 is sent.

Size of payload 2008 (in this case, 2 Bytes size), which indicates the size of the payload portion 2020 in Bytes.

The payload consists of 2 parts:

a YMQ Command part 2010 (in this case, 1 Byte), which indicates what YMQ Command is to be executed.

Details part 2012 for the YMQ Command (in this case, the size of the Details part is a variable length), which is an optional part for providing details of the YMQ Command.

Figure 20:
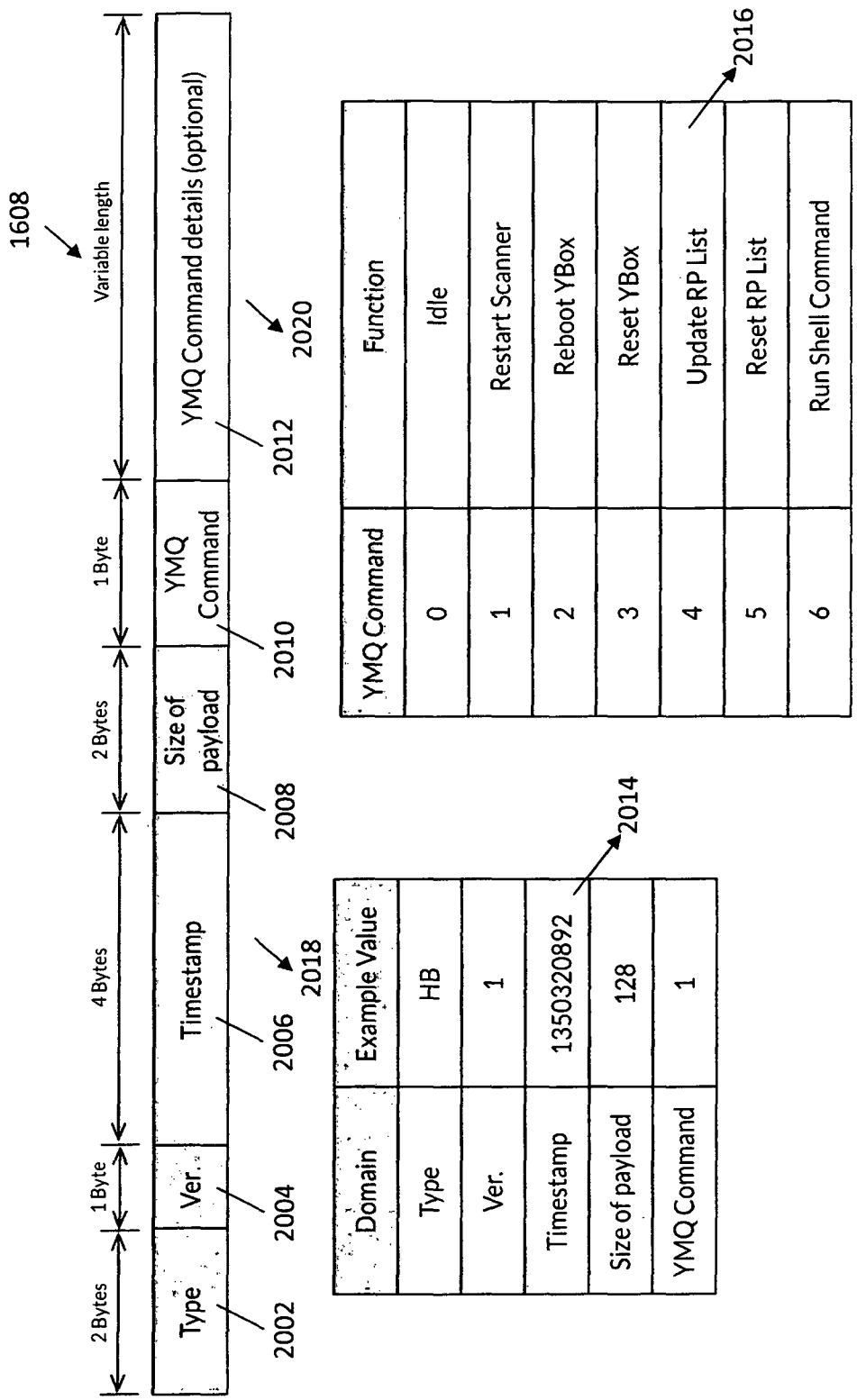
FIG. 20 shows an example of a Heartbeat (HB) Repeat (Rep) Message communicated between the Heartbeat Agent and the Heartbeat Manager.

Table 2014 in FIG. 20 shows example values for each of the domains in the HB Rep Message 1608.

Table 2016 in Figure shows example values of seven YMQ Commands i.e. 0 to 6, and the corresponding functions of the seven YMQ Commands, idle (0), restart scanner (1), reboot YBox (2), reset YBox (3), Update RP List (4), Reset RP List (5), and run Shell Command (6) respectively.

The details part 2012 for the YMQ Command may contain parameters of the corresponding YMQ Command. For example, assuming that two new MAC addresses, MAC1 and MAC2, are to be added into the RP List of a YBox, and at the same time, a MAC address, MAC3, is to be removed from the RP List. In this situation, the Heartbeat Manager 1604 may issue a YMQ Command "4", and the details part 2012 of the YMQ Command may be indicated as [2, 1, MAC1, MAC2, MAC3], where "2" indicates that 2 new MAC addresses are to be added into the RP List, and "1" indicates that 1 MAC address is to be removed from the RP List. MAC1, MAC2 and MAC3 in the detail part 2012 provide the actual data of the MAC addresses of MAC1, MAC2 and MAC3.

Figure 21:
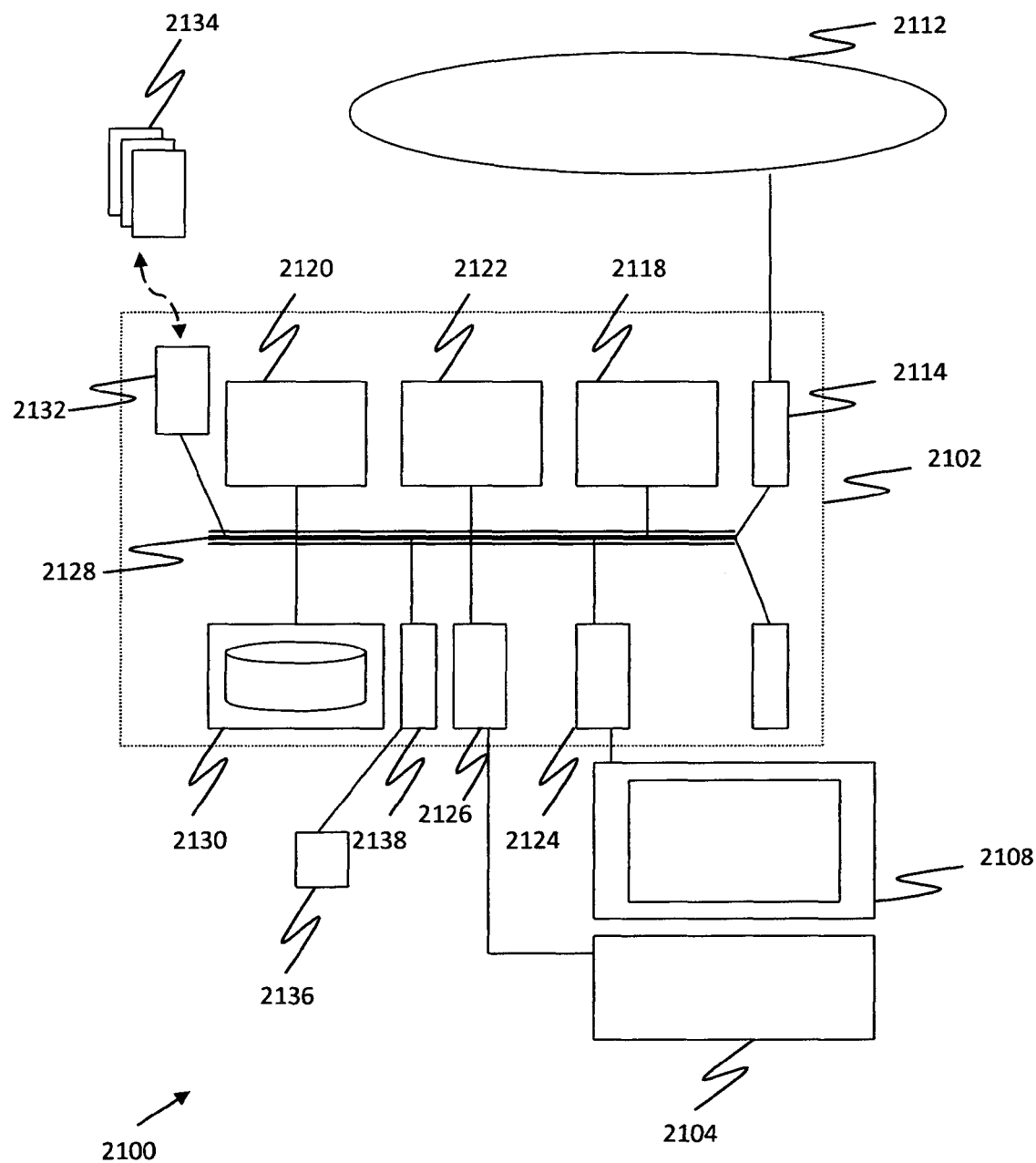
FIG. 21 shows a schematic diagram of a computer system according to an example of the present invention.

The server 116 in FIG. 1 or the one or more Venue Servers 216 in FIG. 2 may be a computer 2100, schematically shown in FIG. 21. There may be provided software, such as one or more computer programs being executed within the computer 2100, and instructing the computer 2100 to communicate with the mobile devices 104 and 204, and the Wireless devices 118, the YBoxes 214, 318, 418, and 518, access the CA/RT List 230, 310, and 510, the database 120 in FIG. 1, RT database 225 and 514 in FIG. 5, FF database 227, and 414, CA database 229 and 314, or carry out other possible server actions.

The word "Heartbeat" mentioned many instances in the present description is merely a descriptive term to indicate that actions such as data communications are carried out periodically and it is in some ways analogous to the beatings of a human heart. For instance, reporting of health and/or availability of certain devices/services to a controller device. The heartbeat mechanisms herein described (e.g. the Heartbeat Agent 210, 316 and 516, Heartbeat Manager 218, and the like) generally serve 2 purposes. One purpose is for reporting health\working statuses of one or more YBoxes (e.g. 114 in FIG. 1, 208 in FIG. 2, 318 in FIG. 3, 418 in FIGS. 4 and 518 in FIG. 5) to one or more venue servers (e.g. 216 in FIGS. 2 and 116 in FIG. 1). The other purpose is for transmitting management commands from the one or more venue servers to the YBoxes for the YBoxes to execute.

The computer 2100 can comprise a processing unit 2102 for processing the one or more computer programs, and includes input modules such as a computer mouse 2136, keyboard/keypad 2104, and/or a plurality of output devices such as a display 2108.

The processing unit 2102 (and the processing unit 108 in FIG. 1) may be connected to the network 2112, for instance, the Internet, via a suitable transceiver device 2114 (i.e. a network interface), to enable access to e.g. the Internet or other network systems such as a wired Local Area Network (LAN) or Wide Area Network (WAN). The processing unit 2102 (and the processing unit 108 in FIG. 1) may also be connected to one or more external wireless communication enabled devices 2134 via a suitable wireless transceiver device 2132 e.g. a WiFi transceiver, Bluetooth module, Mobile telecommunication transceiver suitable for Global System for Mobile Communication (GSM), 3G, 3.5G, 4G telecommunication systems, or the like. The wireless communication enabled devices 2134 may include the mobile devices 104 in FIG. 1 and the Wireless devices 114 in FIG. 1.

The processing unit 2102 (and the processing unit 108 in FIG. 1) may include a processor 618, a Random Access Memory (RAM) 2120 and a Read Only Memory (ROM) 2122. The components of the processing unit 2102 (and the processing unit 108 in FIG. 1) typically communicate via an interconnected bus 2128 and in a manner known to the person skilled in the relevant art.

It is appreciated that the processing unit 108 is not part of the computer 2100 but part of each of the wireless devices 114 in FIG. 1. However, like the processing unit 2102, the processing unit 108 may include a number of Input/Output (I/O) interfaces, for example I/O interface 2138 to the computer mouse 2136, I/O interface 2124 to the display 2108, and I/O interface 2126 to the keyboard/keypad 2104, which are more applicable for server usage.

Furthermore, it is appreciated that each of the mobile devices 104 may include a processing unit like the processing unit 2102. However, it should be configured more for mobile device usage as opposed to the computer 2100, which is configured more for server usage. For instance, the processing unit of each of the mobile devices 104 may include a number of Input/Output (I/O) interfaces like the processing unit 2102 as well but they may be for connection with headphones (not shown), Subscriber identity module (SIM) card (not shown), flash memory card (i.e. example of 2130 in FIG. 21), USB based device (not shown), and the like, which are more for mobile device usage.

The computer programs may further include one or more software applications for e.g. instant messaging platform, audio/video playback, internet accessibility, operating the computer 2100 (i.e. operating system), network security, file accessibility, database management, which are applications typically equipped on a desktop or portable computer. The computer programs may be supplied to the user of the computer 2100 encoded on a data storage medium such as a CD-ROM, on a flash memory carrier or a Hard Disk Drive, and are to be read using a corresponding data storage medium drive of a data storage device 2130. Such application programs may also be downloaded from the network 2112. The application programs are read and controlled in its execution by the processor 2118. Intermediate storage of program data may be accomplished using RAM 2120.

Furthermore, one or more of the steps of the computer programs or software may be performed in parallel rather than sequentially. One or more of the computer programs may be stored on any machine readable medium. The machine readable medium may include storage devices such as magnetic or optical disks, memory chips, or other storage devices suitable for interfacing with a general purpose computer. The machine readable medium may also include a hard-wired medium such as exemplified in the Internet system, or wireless medium such as exemplified in the Wireless LAN (WLAN) system. The computer program when loaded and executed on such a general-purpose computer effectively results in an apparatus (e.g. 100) that implements the steps of the computing methods in examples herein described.

Examples of the invention may have the following advantages.

A method, framework and system architecture for managing a WiFi positioning system that is able to help detect and locate users carrying a WiFi-enabled device within an area.

No requirement for dedicated equipment (e.g. a WiFi tag) that is required to be attached to the users.

No data transmission connection is required between the user's WiFi-enabled device and the WiFi positioning system other than the WiFi positioning system having the capability to receive data packets from the WiFi-enabled device to retrieve MAC address and signal strength information of the WiFi-enabled device.

Both user-initialized positioning service (real time location service, RTLS) and passive footfall tracking are available in a single platform.

No conscious involvement of users is required to provide footfall information as a passive footfall tracking methodology is adopted.

Many modifications and other examples can be made to the method and apparatus for recording information from a plurality of mobile devices in an area by those skilled in the art having the understanding of the above described disclosure together with the drawings. Therefore, it is to be understood that the method and apparatus for recording information from a plurality of mobile devices in an area is not to be limited to the above description contained herein only, and that possible modifications are to be included in the claims of the disclosure.

The invention claimed is:

1. A method for recording information from a plurality of mobile devices in an area, the method comprising:
    listening for data packets from the plurality of mobile devices in a predetermined time period using a wireless device;
    creating a record for containing addresses and signal strength readings associated with the plurality of mobile devices, the addresses and signal strength readings of the mobile devices being retrieved from data packets received by the wireless device when the wireless device is listening;
    determining whether a data packet received by the wireless device during the predetermined time period is from a mobile device of the plurality of mobile devices;
    when the data packet received by the wireless device during the predetermined time period is from the mobile device, determining whether an address associated with the mobile device is recorded in the record;
    updating the record with the address associated with the mobile device and a signal strength reading associated with the mobile device if the address has not been previously recorded in the record during the predetermined time period;
    updating, based on the number of times the record has been updated with a signal strength reading associated with the mobile device during the predetermined time period, the record with a signal strength reading associated with the mobile device the address of the mobile device was previously updated in the record, wherein the predetermined time period comprises:
        a first time period for recording received addresses and signal strength readings associated with one or more of the plurality of mobile devices in the record for tracking footfall of the plurality of mobile devices in the area; and
        a second time period for recording received addresses and signal strength readings associated with one or more of the plurality of mobile devices in a second record created and updated in same manner as the record for estimating location of one or more of the plurality of mobile devices in the area; and
    estimating a location of the mobile device based on the record for tracking footfall of the plurality of mobile devices in the area without initiation by the mobile device and estimating a location of the mobile device based on the second record upon initiation by the mobile device, wherein number of times of recording signal strength readings in the record for tracking footfall of the plurality of mobile devices in the area is lesser than number of times of recording signal strength readings in the second record.

2. The method as claimed in claim 1, the method comprising:
    increasing a count associated with the address of the mobile device each time the record is updated as a result of the wireless device receiving a data packet from the mobile device during the predetermined time period, the count being reset at beginning of the predetermined time period.

3. The method as claimed in claim 2, wherein updating of the record with a signal strength reading associated with the mobile device during the predetermined time period stops when the count reaches a predetermined number.

4. The method as claimed in claim 1, wherein the wireless device communicates with the plurality of mobile devices based on Wireless Fidelity (WiFi) technology.

5. The method as claimed in claim 1, the method comprising:
updating the record with a null signal strength reading if the address of the mobile device was previously updated in the record, and if a data packet is not received from the mobile device before a predetermined sampling time within the predetermined time period expires.

6. The method as claimed in claim 1, the method comprising:
generating a report by
extracting all signal strength readings of the mobile device in the record;
discarding null signal strength reading, if any is present in the record; and
calculating a truncated mean value from the extracted and non-discarded signal strength readings of the mobile device.

7. The method as claimed in claim 6, the method further comprising:
transmitting from the wireless device one or more data packets associated with the report to a collating application of a server for collating a collated report for the mobile device based on data of reports received by the server from the wireless device.

8. The method as claimed in claim 7, wherein estimating of the location of the mobile device comprises:
formatting the collated report;
forwarding the collated report to a processor for calculating the estimated location of the mobile device based on data in the collated report; and
storing the estimated location in a database accessible by the mobile device via a network.

9. The method as claimed in claim 8, the method further comprising:
generating footfall tracking analytics based on estimated locations of more than one of the plurality of mobile devices; and
storing the generated footfall tracking analytics in a footfall tracking database accessible by networked devices.

10. The method as claimed in claim 1, the method further comprising:
transmitting the address of the mobile device to a data management application of a server via a data communication protocol requiring no acknowledgment from a receiver upon receiving a data message from a sender; and
updating the address received by the data management application in a server record, the server record residing in a memory accessible to the server.

11. The method as claimed in claim 10, the operation of creating the record for containing addresses and signal strength readings associated with the plurality of mobile devices further comprising:
appending the address received by the data management application to a data message at the server;
sending the data message from the server to an agent application associated with the wireless device; and
adding the address retrieved from the data message received by the agent application in a third record residing in a memory accessible to the wireless device.

12. An apparatus for recording information from a plurality of mobile devices in an area, the apparatus comprising:
a wireless device configured to listen for data packets from the plurality of mobile devices in a predetermined time period; and
a processing unit configured to:
create a record for containing addresses and signal strength readings associated with the plurality of mobile devices, the addresses and signal strength readings of the mobile devices being retrieved from data packets received by the wireless device when the wireless device is listening;
determine whether a data packet received by the wireless device during the predetermined time period is from a mobile device of the plurality of mobile devices;
when the data packet received by the wireless device during the predetermined time period is from the mobile device, determine whether an address associated with the mobile device is recorded in the record;
update the record with the address associated with the mobile device and a signal strength reading associated with the mobile device if the address has not been previously recorded in the record during the predetermined time period;
update, based on the number of time the record has been updated with a signal strength reading associated with the mobile device during the predetermined time period, the record with a signal strength reading associated with the mobile device if the address of the mobile device was previously updated in the record, wherein the predetermined time period comprises:
a first time period for recording received addresses and signal strength readings associated with one or more of the plurality of mobile devices in the record for tracking footfall of the plurality of mobile devices in the area; and
a second time period for recording received addresses and signal strength readings associated with one or more of the plurality of mobile devices in a second record created and updated in same manner as the record for estimating location of one or more of the plurality of mobile devices in the area; and
estimate a location of the mobile device based on the record for tracking footfall of the plurality of mobile devices in the area without initiation by the mobile device and estimating a location of the mobile device based on the second record upon initiation by the mobile device, wherein number of times of recording signal strength readings in the record for tracking footfall of the plurality of mobile devices in the area is lesser than number of times of recording signal strength readings in the second record.

13. The apparatus as claimed in claim 12, wherein the processing unit is configured to:
increase a count associated with the address of the mobile device each time the record is updated as a result of the wireless device receiving a data packet from the mobile device during the predetermined time period, the count being reset at beginning of the predetermined time period.

14. The apparatus as claimed in claim 13, wherein updating of the record with a signal strength reading associated with the mobile device during the predetermined time period stops when the count reaches a predetermined number.

15. The apparatus as claimed in claim 12, wherein the wireless device communicates with the plurality of mobile devices based on Wireless Fidelity (WiFi) technology.

16. The apparatus as claimed in claim 12, wherein the processing unit is configured to update the record with a null signal strength reading if the address of the mobile device was previously updated in the record, and if a data packet is not received from the mobile device before a predetermined sampling time within the predetermined time period expires.

17. The apparatus as claimed in claim 12, wherein the processing unit is configured to generate a report by:
extracting all signal strength readings of the mobile device in the record;
discarding null signal strength readings, if any are present in the record; and
calculating a truncated mean value from the extracted and non-discarded signal strength readings of the mobile device.

18. The apparatus as claimed in claim 17, the apparatus further comprising a server and the wireless device is configured to:
transmit one or more data packets associated with the report to a collating application of the server for collating a collated report for the mobile device based on data of reports received by the server from the wireless device.

19. The apparatus as claimed in claim 18, wherein the server is configured to estimate the location of the mobile device by:
formatting the collated report;
forwarding the collated report to a processor for calculating the estimated location of the mobile device based on data in the collated report; and
storing the estimated location in a database accessible to the mobile device via a network.

20. The apparatus as claimed in claim 19, wherein the server is configured to:
generate footfall tracking analytics based on estimated locations of more than one of the plurality of mobile devices; and
store the generated footfall tracking analytics in a footfall tracking database accessible to networked devices.

21. The apparatus as claimed in claim 12, wherein the mobile device is configured to:
transmit its address to a data management application run by a server, and
wherein the server is configured to:
update a server record with the address received by the data management application, the server record residing in a memory accessible to the server running the data management application.

22. The apparatus as claimed in claim 21, wherein the server running the data management application is configured to:
append the address received by the data management application to a data message;
send the data message to an agent application associated with the wireless device; and
update the address retrieved from the data message received by the agent application in a third record residing in a memory accessible to the wireless device.

23. A method for recording information from a plurality of mobile devices in an area, the method comprising:
listening for data packets from the plurality of mobile devices in a predetermined time period using a wireless device;
creating a record for containing addresses and signal strength readings associated with the plurality of mobile devices, the addresses and signal strength readings of the mobile devices being retrieved from data packets received by the wireless device when the wireless device is listening;
determining whether a data packet received by the wireless device during the predetermined time period is from a mobile device of the plurality of mobile devices;
when the data packet received by the wireless device during the predetermined time period is from the mobile device, determining whether an address associated with the mobile device is recorded in the record;
updating the record with the address associated with the mobile device and a signal strength reading associated with the mobile device if the address has not been previously recorded in the record during the predetermined time period;
updating, based on the number of times the record has been updated with a signal strength reading associated with the mobile device during the predetermined time period, the record with a signal strength reading associated with the mobile device if the address of the mobile device was previously updated in the record; and
increasing a count associated with the address of the mobile device each time the record is updated as a result of the wireless device receiving a data packet from the mobile device during the predetermined time period, the count being reset at beginning of the predetermined time period, wherein updating of the record with a signal strength reading associated with the mobile device during the predetermined time period stops when the count reaches a predetermined number.

24. The method as claimed in claim 23, wherein the wireless device communicates with the plurality of mobile devices based on Wireless Fidelity (WiFi) technology.

25. The method as claimed in claim 23, wherein the predetermined time period comprises:
a first time period for recording received addresses and signal strength readings associated with one or more of the plurality of mobile devices in the record for tracking footfall of the plurality of mobile devices in the area; and
a second time period for recording received addresses and signal strength readings associated with one or more of the plurality of mobile devices in a second record created and updated in same manner as the record for estimating location of one or more of the plurality of mobile devices in the area.

26. The method as claimed in claim 23, the method comprising:
updating the record with a null signal strength reading if the address of the mobile device was previously updated in the record, and if a data packet is not received from the mobile device before a predetermined sampling time within the predetermined time period expires.

27. The method as claimed in claim 23, the method comprising:
generating a report by extracting all signal strength readings of the mobile device in the record;
discarding null signal strength readings, if any is present in the record; and
calculating a truncated mean value from the extracted and non-discarded signal strength readings of the mobile device.

28. The method as claimed in claim 27, the method further comprising:
transmitting from the wireless device one or more data packets associated with the report to a collating application of a server for collating a collated report for the mobile device based on data of reports received by the server from the wireless device.

29. The method as claimed in claim 28, wherein estimating of the location of the mobile device comprises:
formatting the collated report;
forwarding the collated report to a processor for calculating the estimated location of the mobile device based on data in the collated report; and
storing the estimated location in a database accessible by the mobile device via a network.

30. The method as claimed in claim 29, the method further comprising:
generating footfall tracking analytics based on estimated locations of more than one of the plurality of mobile devices; and
storing the generated footfall tracking analytics in a footfall tracking database accessible by networked devices.

31. The method as claimed in claim 23, the method further comprising:
transmitting the address of the mobile device to a data management application of a server via a data communication protocol requiring no acknowledgment from a receiver upon receiving a data message from a sender; and
updating the address received by the data management application in a server record, the server record residing in a memory accessible to the server.

32. The method as claimed in claim 31, the operation of creating the record for containing addresses and signal strength readings associated with the plurality of mobile devices further comprising:
appending the address received by the data management application to a data message at the server;
sending the data message from the server to an agent application associated with the wireless device; and
adding the address retrieved from the data message received by the agent application in a third record residing in a memory accessible to the wireless device.

33. An apparatus that records information from a plurality of mobile devices in an area, the apparatus comprising:
a wireless device configured to listen for data packets from the plurality of mobile devices in a predetermined time period; and
a processing unit configured to:
create a record for containing addresses and signal strength readings associated with the plurality of mobile devices, the addresses and signal strength readings of the mobile devices being retrieved from data packets received by the wireless device when the wireless device is listening;
determine whether a data packet received by the wireless device during the predetermined time period is from a mobile device of the plurality of mobile devices;
when the data packet received by the wireless device during the predetermined time period is from the mobile device, determine whether an address associated with the mobile device is recorded in the record;
update the record with the address associated with the mobile device and a signal strength reading associated with the mobile device if the address has not been previously recorded in the record during the predetermined time period;
update, based on the number of times the record has been updated with a signal strength reading associated with the mobile device during the predetermined time period, the record with a signal strength reading associated with the mobile device if the address of the mobile device was previously updated in the record; and—
increase a count associated with the address of the mobile device each time the record is updated as a result of the wireless device receiving a data packet from the mobile device during the predetermined time period, the count being reset at beginning of the predetermined time period, wherein updating of the record with a signal strength reading associated with the mobile device during the predetermined time period stops when the count reaches a predetermined number.

34. The apparatus as claimed in claim 33, wherein the wireless device communicates with the plurality of mobile devices based on Wireless Fidelity (WiFi) technology.

35. The apparatus as claimed in claim 33, wherein the predetermined time period comprises a first time period for recording received addresses and signal strength readings associated with one or more of the plurality of mobile devices in the record for tracking footfall of the plurality of mobile devices in the area, and a second time period for recording received addresses and signal strength readings associated with one or more of the plurality of mobile devices in a second record created and updated in same manner as the record for estimating location of one or more of the plurality of mobile devices in the area.

36. The apparatus as claimed in claim 33, wherein the processing unit is configured to update the record with a null signal strength reading if the address of the mobile device was previously updated in the record, and if a data packet is not received from the mobile device before a predetermined sampling time within the predetermined time period expires.

37. The apparatus as claimed in claim 33, wherein the processing unit is configured to generate a report by:
extracting all signal strength readings of the mobile device in the record;
discarding null signal strength readings, if any are present in the record; and
calculating a truncated mean value from the extracted and non-discarded signal strength readings of the mobile device.

38. The apparatus as claimed in claim 37, the apparatus further comprising a server and the wireless device is configured to:
transmit one or more data packets associated with the report to a collating application of the server for collating a collated report for the mobile device based on data of reports received by the server from the wireless device.

39. The apparatus as claimed in claim 38, wherein the server is configured to estimate the location of the mobile device by:
formatting the collated report;
forwarding the collated report to a processor for calculating the estimated location of the mobile device based on data in the collated report; and
storing the estimated location in a database accessible to the mobile device via a network.

40. The apparatus as claimed in claim 39, wherein the server is configured to:

generate footfall tracking analytics based on estimated locations of more than one of the plurality of mobile devices; and store the generated footfall tracking analytics in a footfall tracking database accessible to networked devices.

41. The apparatus as claimed in claim 33, wherein the mobile device is configured to:
   transmit its address to a data management application run by a server, and
   wherein the server is configured to:
   update a server record with the address received by the data management application, the server record residing in a memory accessible to the server running the data management application.

42. The apparatus as claimed in claim 41, wherein the server running the data management application is configured to:
   append the address received by the data management application to a data message;
   send the data message to an agent application associated with the wireless device; and
update the address retrieved from the data message received by the agent application in a third record residing in a memory accessible to the wireless device.

43. A method for recording information from a plurality of mobile devices in an area, the method comprising:
   listening for data packets from the plurality of mobile devices in a predetermined time period using a wireless device;
   creating a record for containing addresses and signal strength readings associated with the plurality of mobile devices, the addresses and signal strength readings of the mobile devices being retrieved from data packets received by the wireless device when the wireless device is listening;
   determining whether a data packet received by the wireless device during the predetermined time period is from a mobile device of the plurality of mobile devices; and
   when the data packet received by the wireless device during the predetermined time period is from the mobile device:
      determining whether an address associated with the mobile device is recorded in the record;
      updating the record with the address associated with the mobile device and a signal strength reading associated with the mobile device if the address has not been previously recorded in the record during the predetermined time period;
      updating, based on the number of times the record has been updated with a signal strength reading associated with the mobile device during the predetermined time period, the record with a signal strength reading associated with the mobile device if the address of the mobile device was previously updated in the record; and
      updating the record with a null signal strength reading if the address of the mobile device was previously updated in the record, and if a data packet is not received from the mobile device before a predetermined sampling time within the predetermined time period expires.

44. The method as claimed in claim 43, the method comprising:
   increasing a count associated with the address of the mobile device each time the record is updated as a result of the wireless device receiving a data packet from the mobile device during the predetermined time period, the count being reset at beginning of the predetermined time period.

45. The method as claimed in claim 43, wherein the wireless device communicates with the plurality of mobile devices based on Wireless Fidelity (WiFi) technology.

46. The method as claimed in claim 43, wherein the predetermined time period comprises:
   a first time period for recording received addresses and signal strength readings associated with one or more of the plurality of mobile devices in the record for tracking footfall of the plurality of mobile devices in the area; and
   a second time period for recording received addresses and signal strength readings associated with one or more of the plurality of mobile devices in a second record created and updated in same manner as the record for estimating location of one or more of the plurality of mobile devices in the area.

47. The method as claimed in claim 43, the method comprising:
   generating a report by extracting all signal strength readings of the mobile device in the record;
   discarding null signal strength readings, if any is present in the record; and
   calculating a truncated mean value from the extracted and non-discarded signal strength readings of the mobile device.

48. The method as claimed in claim 43, the method further comprising:
   transmitting from the wireless device one or more data packets associated with the report to a collating application of a server for collating a collated report for the mobile device based on data of reports received by the server from the wireless device.

49. The method as claimed in claim 48, wherein estimating the location of the mobile device comprises:
   formatting the collated report;
   forwarding the collated report to a processor for calculating the estimated location of the mobile device based on data in the collated report; and
   storing the estimated location in a database accessible by the mobile device via a network.

50. The method as claimed in claim 49, the method further comprising:
   generating footfall tracking analytics based on estimated locations of more than one of the plurality of mobile devices; and
   storing the generated footfall tracking analytics in a footfall tracking database accessible by networked devices.

51. The method as claimed in claim 43, the method further comprising:
   transmitting the address of the mobile device to a data management application of a server via a data communication protocol requiring no acknowledgment from a receiver upon receiving a data message from a sender; and
   updating the address received by the data management application in a server record, the server record residing in a memory accessible to the server.

52. The method as claimed in claim 51, the operation of creating the record for containing addresses and signal strength readings associated with the plurality of mobile devices further comprising:
   appending the address received by the data management application to a data message at the server;

sending the data message from the server to an agent application associated with the wireless device; and adding the address retrieved from the data message received by the agent application in a third record residing in a memory accessible to the wireless device.

53. An apparatus that records information from a plurality of mobile devices in an area, the apparatus comprising:

a wireless device configured to listen for data packets from the plurality of mobile devices in a predetermined time period; and a processing unit configured to:

create a record for containing addresses and signal strength readings associated with the plurality of mobile devices, the addresses and signal strength readings of the mobile devices being retrieved from data packets received by the wireless device when the wireless device is listening;

determine whether a data packet received by the wireless device during the predetermined time period is from a mobile device of the plurality of mobile devices; and when the data packet received by the wireless device during the predetermined time period is from the mobile device:

determine whether an address associated with the mobile device is recorded in the record;

update the record with the address associated with the mobile device and a signal strength reading associated with the mobile device if the address has not been previously recorded in the record during the predetermined time period;

update, based on the number of times the record has been updated with a signal strength reading associated with the mobile device during the predetermined time period, the record with a signal strength reading associated with the mobile device if the address of the mobile device was previously updated in the record; and update the record with a null signal strength reading if the address of the mobile device was previously updated in the record, and if a data packet is not received from the mobile device before a predetermined sampling time within the predetermined time period expires.

54. The apparatus as claimed in claim 53, wherein the processing unit is configured to:

increase a count associated with the address of the mobile device each time the record is updated as a result of the wireless device receiving a data packet from the mobile device during the predetermined time period, the count being reset at beginning of the predetermined time period.

55. The apparatus as claimed in claim 53, wherein the wireless device communicates with the plurality of mobile devices based on Wireless Fidelity (WiFi) technology.

56. The apparatus as claimed in claim 53, wherein the predetermined time period comprises a first time period for recording received addresses and signal strength readings associated with one or more of the plurality of mobile devices in the record for tracking footfall of the plurality of mobile devices in the area, and a second time period for recording received addresses and signal strength readings associated with one or more of the plurality of mobile devices in a second record created and updated in same manner as the record for estimating location of one or more of the plurality of mobile devices in the area.

57. The apparatus as claimed in claim 53, wherein the processing unit is configured to generate a report by:

extracting all signal strength readings of the mobile device in the record;

discarding null signal strength readings, if any are present in the record; and calculating a truncated mean value from the extracted and non-discarded signal strength readings of the mobile device.

58. The apparatus as claimed in claim 57, the apparatus further comprising a server and the wireless device is configured to:

transmit one or more data packets associated with the report to a collating application of the server for collating a collated report for the mobile device based on data of reports received by the server from the wireless device.

59. The apparatus as claimed in claim 58, wherein the server is configured to estimate the location of the mobile device by:

formatting the collated report;

forwarding the collated report to a processor for calculating the estimated location of the mobile device based on data in the collated report; and storing the estimated location in a database accessible to the mobile device via a network.

60. The apparatus as claimed in claim 59, wherein the server is configured to:

generate footfall tracking analytics based on estimated locations of more than one of the plurality of mobile devices; and store the generated footfall tracking analytics in a footfall tracking database accessible to networked devices.

61. The apparatus as claimed in claim 53, wherein the mobile device is configured to:

transmit its address to a data management application run by a server, and wherein the server is configured to:

update a server record with the address received by the data management application, the server record residing in a memory accessible to the server running the data management application.

62. The apparatus as claimed in claim 61, wherein the server running the data management application is configured to:

append the address received by the data management application to a data message;

send the data message to an agent application associated with the wireless device; and update the address retrieved from the data message received by the agent application in a third record residing in a memory accessible to the wireless device.

* * * * *